US012573770B2

(12) United States Patent
Fang et al.

(10) Patent No.: US 12,573,770 B2
(45) Date of Patent: Mar. 10, 2026

(54) MOBILE PLATFORM RADIO ACCESS NETWORK TECHNOLOGY

(71) Applicant: T-Mobile Innovations LLC, Overland Park, KS (US)

(72) Inventors: Zheng Fang, Mclean, VA (US); Galip Murat Karabulut, Vienna, VA (US); Lyle W. Paczkowski, Mission Hills, KS (US); George Jason Schnellbacher, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 143 days.

(21) Appl. No.: 18/522,094

(22) Filed: Nov. 28, 2023

(65) Prior Publication Data

US 2025/0174915 A1 May 29, 2025

(51) Int. Cl.
*H01Q 21/28* (2006.01)
*H01Q 1/32* (2006.01)

(52) U.S. Cl.
CPC ............... *H01Q 21/28* (2013.01); *H01Q 1/32* (2013.01)

(58) Field of Classification Search
CPC ................................ H01Q 1/32; H01Q 21/28
See application file for complete search history.

(56) References Cited

U.S. PATENT DOCUMENTS 9,750,078 B2 * 8/2017 Bergek ................ H04W 84/005
2010/0284315 A1 * 11/2010 Lee .......................... H04B 5/28 370/310.2
2012/0106443 A1 5/2012 Chen et al.
2014/0031012 A1 1/2014 Park et al.
2014/0228039 A1 8/2014 Zhao et al.
2015/0350878 A1 12/2015 Li et al.
2015/0382178 A1 12/2015 Park et al.
2016/0007190 A1 1/2016 Wane
2016/0246611 A1 8/2016 Li et al.
2016/0361356 A1 12/2016 Roth et al.
2021/0076194 A1 3/2021 Obaidi et al.
2022/0038887 A1 2/2022 Chaugule et al.
2022/0225448 A1 7/2022 Li et al.
2023/0396977 A1 12/2023 Akdim et al.
(Continued)

FOREIGN PATENT DOCUMENTS

CA 2972647 A1 * 1/2018 .............. H04W 8/26
EP 2472740 A1 * 7/2012 ........... H04B 7/2606

OTHER PUBLICATIONS

Fang, Zheng, et al., "Mobile Core Network", filed Nov. 28, 2023, U.S. Appl. No. 18/522,089.
(Continued)

*Primary Examiner* — Hoang V Nguyen

(57) ABSTRACT

In some examples, a method of managing communication includes receiving, at an access point, communication from multiple user devices, aggregating the communication from the multiple user devices to form a first aggregated communication, transmitting the first aggregated communication to a mobile core network, aggregating, at the first mobile network core, the first aggregated communication with communication from a second access point to form a second aggregated communication, and transmitting the second aggregated communication to a macro core network.

20 Claims, 14 Drawing Sheets

(56) References Cited

U.S. PATENT DOCUMENTS

| | | | |
|---|---|---|---|
| 2024/0147216 | A1 | 5/2024 | Kim et al. |
| 2025/0175772 | A1 | 5/2025 | Fang et al. |
| 2025/0175783 | A1 | 5/2025 | Fang et al. |
| 2025/0176039 | A1 | 5/2025 | Fang et al. |

OTHER PUBLICATIONS

Fang, Zheng, et al., "Mobile Core Network Data Management", filed Nov. 28, 2023, U.S. Appl. No. 18/522,097.
Fang, Zheng, et al., "Traveling Subscriber Identity Module", filed Nov. 28, 2023, U.S. Appl. No. 18/522,102.
Restriction Requirement dated Oct. 8, 2025, U.S. Appl. No. 18/522,102, filed Nov. 28, 2023.
First Office Action dated Jan. 5, 2026, U.S. Appl. No. 18/522,102, filed Nov. 28, 2023.

* cited by examiner

MOBILE PLATFORM RADIO ACCESS NETWORK TECHNOLOGY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user device connects to a wireless communication network via radio frequency (RF) signal radiation. In areas in which RF reception is weak, the user device may expend a greater amount of power attempting to establish, or maintain, a connection to the wireless communication network. In some areas in which RF reception is weak, the user device may be incapable of establishing or maintaining a connection to the wireless communication network with a radio or antenna set available to, or in, the user device.

SUMMARY

In some examples, a communication system is implemented in a transportation vehicle. The communication system is for relaying data communication between a user device and a macro core network. The communication system includes a first access point disposed in the transportation vehicle, a first antenna disposed in the transportation vehicle and coupled to the first access point, a second antenna disposed in the transportation vehicle and coupled to the first access point, wherein the first access point is configured to receive a first communication from the user device via one of the first antenna or the second antenna and transmit a second communication based on the first communication, a mobile core network disposed in the transportation vehicle and coupled to the first access point, the mobile core network configured to receive the second communication from the first access point and aggregate the second communication, and a third antenna disposed on an exterior of the transportation vehicle and coupled to the mobile core network, wherein the mobile core network is configured to transmit the aggregated second communication via the third antenna to the macro core network.

In some examples, a communication network is implemented in a moving platform having a first compartment and a second compartment. The communication network includes a plurality of access points disposed inside the first compartment, a mobile core network disposed in the second compartment, a backhaul communication device communicatively coupling the plurality of access points to the mobile core network, and an antenna disposed on an exterior of the moving platform and communicatively coupled to the mobile core network.

In some examples, a method of managing communication includes receiving, at an access point, communication from multiple user devices, aggregating the communication from the multiple user devices to form a first aggregated communication, transmitting the first aggregated communication to a mobile core network, aggregating, at the first mobile network core, the first aggregated communication with communication from a second access point to form a second aggregated communication, and transmitting the second aggregated communication to a macro core network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
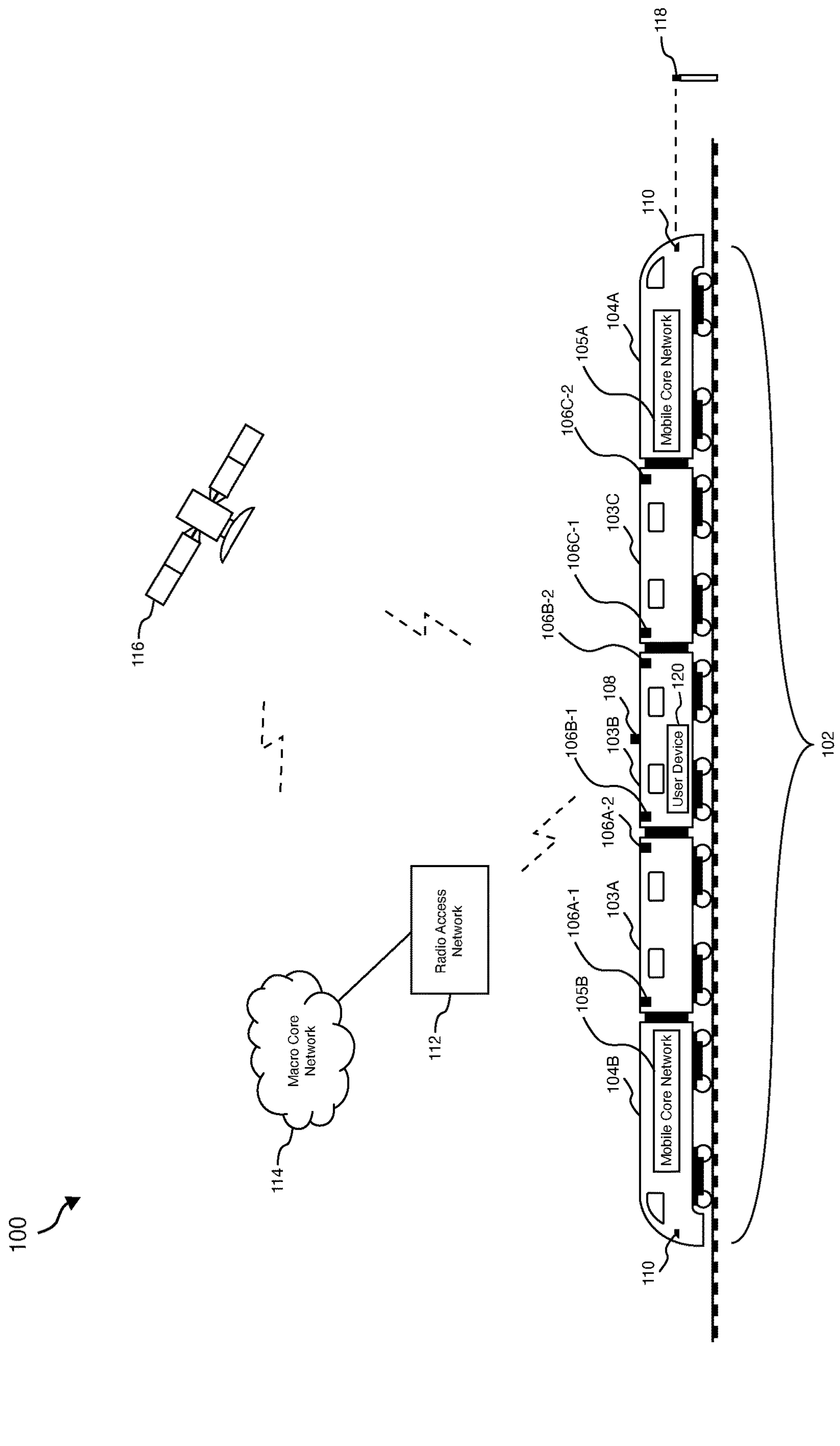
FIG. 1 is a block diagram of a system according to an example of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, a user device (e.g., user equipment, or UE) connects to a wireless communication network via radio frequency (RF) signal radiation. In areas in which RF reception is weak, the user device may expend a greater amount of power attempting to establish, or maintain, a connection to the wireless communication network. In some areas in which RF reception is weak, the user device may be incapable of establishing or maintaining a connection to the wireless communication network with a radio or antenna set available to, or in, the user device. For example, as a transportation vehicle moves from a start point to an endpoint, or more generally from any point A to any other point B, the transportation vehicle may move through areas of comparatively strong RF reception associated with the wireless communication network (or another wireless communication which the user device may access, such as a roaming network), and areas of comparatively low RF reception. While in the areas of low RF reception, the user device may expend a greater amount of power attempting to discover and connect to a wireless communication network than the user does while connected to a wireless communication network. Similarly, an antenna or radio of the user device may be incapable of enabling the user device to establish or maintain a connection to the wireless communication network, such as resulting from a distance between an access point of the wireless communication network and the user device, attenuation of RF signals by a structure of the transportation vehicle in which the user device is located, a lack of line of sight between the access point and the user device, or the like.

Examples of this description provide for a mobile core network. In some examples, the mobile core network is a fifth-generation standard (5G) mobile core network. However, in other examples the mobile core network may be according to any suitable standard. The core network may be located within a mobile environment or moving platform, such as a transportation vehicle. As described herein, the transportation vehicle may be a train. In other examples, the transportation vehicle may be an airplane, a boat, a bus, a semi (e.g. tractor-trailer), or any other transportation vehicle. The core network may be mobile by virtue of its inclusion in the transportation vehicle which moves from one place to another and is therefore itself, mobile. The mobile core network may be contrasted to a conventional, or macro, core network which remains stationary and to which mobile user devices communicatively couple via access points which have a backhaul connection to the macro core network, often through hardwired, private connections, such as via fiber optic cables. In some examples, the mobile core network is transportable such that the mobile core network is readily mobile between two locations, but may remain stationary or mobile during operation. For example, a network operator may deploy a mobile core network in support of disaster relief efforts, or to provide localized service in high demand locations, such as major sporting events, large-attendance activities that may stress existing telecommunication infrastructure, or the like. Generally, the macro core network may be considered a static network implemented in one or more data centers and not readily transportable, and the mobile core network may be considered a nomadic core network that may be operational while in motion, or may be readily transportable between locations based on a particular need or application use case.

In some examples, the mobile core network is microtized. For example, the mobile core network may include a subset of functionality of the macro core network. The subset of functionality may be application environment specific such that the mobile core network includes only the components of functionality required to operate in the application environment in which the mobile core network is deployed. In some examples, the functionality included in the mobile core network may be optimized to increase efficiency, decrease power consumption, increase operational speed, or otherwise tune the mobile core network in a manner different from the macro core network. Some examples of the mobile core network are implemented in, or on, a system-on-a-chip (SoC). Other examples of the mobile core network may be implemented in a cluster computing arrangement, a single-server arrangement, or a specifically designed processor, such as may be implemented, in some examples, on an application specific integrated circuit (ASIC). A SoC is an integrated circuit that integrates multiple components of a computing system into the circuit, enabling programming or configuration of the base-level silicon of the SoC, such as via programming of a field programmable gate array (FPGA). This programmability and high degree of integration enables operation of application-level functionality (e.g., functionality at layer 7 of the Open Systems Interconnection (OSI) communication model) at a physical layer (e.g., layer 1 of the OSI communication model), resulting in increased speed of the SoC compared to conventional approaches in which servers or multiple separate computing devices are programmed or loaded with software to perform the functionality provided by the SoC.

In some examples, the mobile core network operates as, or includes, an edge device. The edge device may store and/or serve content to user devices located in the transportation device. For example, the edge device may cache media content, such as music content, video content, game content, or other user-consumable digital content and serve that content to users communicatively coupled to the mobile core network.

The mobile core network communicates with user devices and with the macro core network via a radio access network. However, the transportation vehicle presents unique challenges to a topology of a radio access network implemented in the transportation vehicle. For example, the transportation vehicle may include both internal antennas for communicatively coupling user devices to the mobile core network, and external antennas to communicatively coupling the mobile core network to the macro core network (e.g., providing backhaul between the mobile core network and the macro core network). In some examples, the internal and/or the external antennas provide RF communication. In other examples, the external antennas are implemented as devices capable of performing line-of-sight, open-air optical transmissions. In other examples, the external antennas are implemented as unidirectional (e.g., directed) RF antennas capable of performing line-of-sight transmissions at distances greater than omnidirectional RF antennas. In some examples, the transportation vehicle includes multiple internal antennas, such as a first antenna at a front of an interior compartment of the transportation and a second antenna at a rear of the interior compartment. In other examples, the internal antennas are distributed throughout the interior compartment, such as in, or attached to, a ceiling and/or wall of the interior compartment, under seats of the interior compartment, or any other combination of locations within an exterior structure of the transportation vehicle. The external antenna(s) may be omnidirectional, or may be an array (or more generally, multiple) of unidirectional antennas, each directed in different directions. In some examples, the antenna(s) may be articulable, such that the antenna may be mechanically repositioned to increase RF signal strength between the antenna and an access point of the macro network. In yet other examples, a hull, structure, or other existing feature of the transportation vehicle is suitable for operation as an antenna. In some examples, at least some antennas connected to the transportation vehicle and accessible to the mobile core network facilitate communication via satellite and/or any other suitable communication method other than a radio access network.

In some examples, a user device communicatively couples to an access point via one of the internal antennas. The access point may receive a first communication from the user device and transmit the first communication, or aggregate the first communication with a second communication to form a first aggregated communication and transmit the first aggregated communication, to a mobile core network. The transmission may be via a backhaul communication device, such as a fiber optic cable, mmWave transmitters, or the like. The mobile core network receives communication from one or more access points and aggregates the received communication to form a second aggregated communication. The mobile core network may transmit the second aggregated communication via one or more external antennas. In an example, the mobile core network aggregating communication from the access point(s) enables user devices communicating with the access point(s) to benefit from the increased power and size provided by the internal antennas and the external antenna(s). This may enable communication between the user device and the macro core network, via relay by the mobile core network, at greater distances or in locations that would not otherwise be achievable by the user device communicating with the macro core network without using the mobile core network as a relay. In some examples, the user device communicatively connecting to a network provided by the mobile core network, the access point(s), and the internal antennas enables the user device to consume less stored battery power than if the user device attempted to maintain a data connection with the macro core network without using the mobile core network as a relay.

In some examples, the mobile core network is communicatively coupled, such as via one or more access points, to one or more sensors of the transportation vehicle to receive sensor data. In some examples, at least some of the sensors are Internet of Things (IoT) devices. The sensors may provide telemetry information of the transportation device, may read or receive data from devices which the transportation vehicle passes, and/or may provide any other information. In an example, the access point(s) transmit the sensor data, or aggregate and transmit the aggregated sensor data, to the mobile core network. The mobile core network may function as a data center, storing or caching the sensor data for analysis or other use. In some examples, the mobile core network stores the sensor data and transmits the sensor data when the mobile core network has a connection to the macro core network having a signal strength between the mobile core network and a radio access network of the macro core network greater than a threshold amount. In this way, the mobile core network may optimize data transmission between the mobile core network and the macro core network, such as by waiting to transmit the data until a lower cost transmission option is available (e.g., lower cost RF or line-of-sight communication vs. higher cost satellite communication). In other examples, the mobile core network transmits determines that some sensor data is high priority data and transmits at least some of the sensor data deemed higher priority (e.g., such as telemetry sensor data) via a first communication interface, such as satellite communication, while storing other sensor data deemed lower priority for transmission when the connection to the macro core network has the signal strength greater than the threshold amount.

In some examples, it may be useful to prioritize a user device routing at least some communication (e.g., such as data communication) through the mobile core network rather than attempting to communicate directly with the macro core network. To provide communication policies to the user device, a traveling subscriber identity module (SIM), or tSIM, may be provided. In some examples, the tSIM is implemented via an application provided by an operator of the transportation vehicle. By interacting with the application, a user may cause the application to provision or program the tSIM to the user device as an electronic SIM. The tSIM may therefore enforce policies upon the user device, such as augmenting certain functionality while modifying other. For example, policies enforced by the tSIM may prevent the user device from connecting directly to the macro core network while the tSIM is active, may prevent the user device from connecting directly to the macro core network if an RF signal strength is less than a threshold amount, may dictate that the user device communicates via a particular communication method (e.g., connection to the mobile core network, connection the macro core network via a radio access network of the macro core network, connection to the macro core network via a satellite, etc.) based on geographic location of the user device, signal strength of respective communication methods, or any other suitable criteria.

In some examples, the user device may be programmed at a first time to communicate with a macro core network via a baseband processing unit of the user device according to a first SIM. While programmed to communicate with the macro core network according to the first SIM, the user device may receive a tSIM. Subsequently, the user device may receive an instruction to initiate the tSIM and, responsive to which, the user device programs a second SIM (such as via programming the baseband processing unit) on the user device based on the tSIM. The second SIM may be an electronic SIM. The second SIM may include multiple profiles that control communication of the user device via the baseband processing unit, which may vary based on various operational circumstances (e.g., geographic location, signal strength, etc.) of the user device. Subsequent to the programming, the user device may communicate with the mobile core network via the baseband processing unit according to the second SIM rather than communicating with the macro core network directly. In some examples, the second SIM disables certain functionality of the user device, such as an ability to communicate with the macro core network without using the mobile core network as a relay. In some examples, the second SIM controls the user device to communicate with the mobile core network at a first time based on a first geographic location of the user device and controls the user device to communicate with the macro core network at a second time based on a second geographic location of the user device.

In at least some examples, the mobile core network described above, as well as the supporting radio access network, data management, and tSIM improve performance of the user device by decreasing an amount of time which the user device spends attempting to locate, authenticate with, and connect to wireless communication networks, and particularly so in circumstances of low RF signal strength. The decreased amount of time spent by the user device attempting to locate, authenticate with, and connect to wireless communication networks results in an improved user experience for a user of the user device through decreased power consumption of the user device and increased durations of connectivity between the user device and the wireless communication network.

FIG. 1 is a block diagram of a mobile communication system 100, in accordance with various examples. As noted above, the system 100 is shown and described in the context of a train 102. Generally, the train 102 is shown and described in the context of a passenger train. However, in other examples, the train 102 may be representative of a cargo or freight train, or of a train having both passenger-oriented cars and freight-oriented cars. However, the teachings of this disclosure may be equally applicable to other transportation vehicles and are not limited to trains. Further, at least some of the teachings of this disclosure may be applicable to stationary, or non-mobile, application environments, such as sports or entertainment venues, educational institutions, government or high-security installations, corporate offices, or the like.

In an example, the system 100 includes a train 102 having multiple intermediate train cars 103 (e.g., 103A, 103B, 103C). The train 102 further has one or more terminating train cars 104 (e.g., 104A, 104B). A terminating car 104 may be more commonly referred to as an "engine," or "locomotive," and generally provides propulsion and/or other control of the train 102. The intermediate cars 103 are train cars which may be coupled to a terminating car 104 and pulled (or pushed) by the terminating car 104. The terminating car 104A includes a mobile core network 105A. In some examples, the terminating car 104B also includes a mobile core network 105B (collectively with the mobile core network 105A referred to as a mobile core network 105). In an example, the mobile core network 105 may be located in the terminating car 104 resulting from the terminating car 104 being a control point of the train 102. In some examples, operation of each of the mobile core network 105A and the mobile core network 105B, respectively, is protected by a power conditioner (not shown), such as an uninterrupted power supply, which may provide a substantially consistent power signal to the mobile core network 105A and the mobile core network 105B and, in some examples, may provide supplementary or backup power to each of the mobile core network 105A and the mobile core network 105B in the event of a loss of main power. In various examples, as intermediate cars 103 and/or terminating cars 104 are added or removed from a train 102, a local network, and/or a local radio access network, of the train 102 may be reconfigured to accommodate for the added or removed cars 103. In some examples, the reconfiguration may be substantially similar to a reconfiguration of a macro core network 114 reconfiguring responsive to one or more access points (not shown) of a radio access network 112 of the macro core network 114 going offline or coming online. In some examples, the reconfiguration may be performed based on neighbor relationship updates, Automatic Neighbor Relation (ANR) procedures, or the like.

In an example, each intermediate car 103 includes any suitable number of internal antennas 106 (e.g., 106A-1, 106A-2, 106B-1, 106B-2, etc.). While each intermediate car 103 is shown as having two internal antennas 106, one at a front of the intermediate car 103 and one at a rear of the intermediate car 103, any number of internal antennas 106 may be present, and the internal antennas 106 may be arranged in any suitable manner. For example, the internal antennas 106 may be distributed in the intermediate car 103, such as in, or attached to, a ceiling and/or wall of the intermediate car 103, under seats of the intermediate car 103, or any other combination of locations within an exterior structure of the intermediate car 103. In an example, each of the internal antennas 106 is communicatively coupled to the mobile core network 105. The coupling may be wireless, such as via a mesh network or other wireless communication among the internal antennas 106, or may be wired, such as via fiber optic cabling (not shown) coupling each intermediate car 103 to a terminating car 104, either directly or through another intermediate car 103.

Any one or more intermediate cars 103 may also include an external antenna 108. As shown in FIG. 1, the intermediate car 103B includes an external antenna 108. However, in other examples, the external antenna 108 may instead be implemented on the intermediate car 103A, 103C, or external antennas 108 may be implemented on multiple intermediate cars 103. Further, in some examples, one or more of the terminating cars 104 may additionally, or alternatively, include external antennas 108. In some examples, the external antenna 108 is an omnidirectional antenna. In other examples, the external antenna 108 is implemented as an array of two or more unidirectional, or non-omnidirectional, antennas. In some examples, the external antenna 108 is articulable, such as via a mechanical or motorized mounting, to enable directional control and positioning of the external antenna 108.

In some examples, the terminating cars 104 also include directional antennas 110. In some examples, the directional antennas are mounted at a specified height with respect to a bottom of the train 102, such as to provide directed, or line-of-sight communication.

In some examples, the system 100 also includes the radio access network 112, the macro core network 114, and a satellite 116. In an example, the mobile core network 105 communicates with the macro core network 114 via the radio access network 112 and/or the satellite 116. In some examples, the communication is performed via the external antenna 108 and one or both of the radio access network 112 and/or the satellite 116. In other examples, the mobile core network 105 communicates with the macro core network 114 via transmission from a directional antenna 110 to a line-of-sight device 118. The line-of-sight device 118, in some examples, is communicatively coupled to the macro core network 114, such as via a fiber optic cable, copper, or other hardwired coupling.

In an example of operation of the system 100, the mobile core network 105 is a microtized core network including a subset of functionality of the macro core network 114. For example, the mobile core network 105 may include baseband functionality (e.g., capability for controlling radios or antennas coupled to the mobile core network 105), a user plane function (UPF) for performing data routing, security functionality, an access and mobility management function (AMF), and a session management function (SMF). In some examples, the AMF and the SMF may have reduced functionality, such as to optimize the AMF and the SMF for operation with the mobile core network 105, with respect to functionality provided by an AMF and an SMF, respectively, in the macro core network 114. In some examples, the mobile core network 105 may omit, or not include, a Unified Data Management (UDM), a Unified Data Repository (UDR), and/or a Policy Control Function (PCF). In some examples, the security functionality provides security for the mobile core network 105 in compliance with one or more standards or protocols, such as providing a base level of security for the mobile core network 105 compliant with domestic communication infrastructure (DCI) security standards. In some examples, at least some of the mobile core network 105 is implemented in a trusted execution environment (TEE), such as to prevent unauthorized reprogramming or modification of operation or configuration of the mobile core network 105. In some examples, the mobile core network 105 is implemented as a SoC, as described above herein.

The mobile core network 105 establishes a wireless communication session with user devices, such as the user device 120, located in the train 102. While one user device 120 is shown, and the user device 120 is shown in the intermediate car 103B, the teachings of this description are applicable to any number of user devices having any distribution among the intermediate cars 103, and in some examples, the terminating cars 104. A wireless communication session is established between the user device 120 and the mobile core network 105 according to any suitable process, the scope of which is not limited herein. In some examples, a process of the user device 120 establishing a wireless communication session with the mobile core network 105 may be substantially similar to a process by which the user device 120 would establish a wireless communication session with the macro core network 114.

In some examples, the mobile core network 105 functions as a relay between the user device 120 and the macro core network 114. For example, as described above, communication of the user device 120 being routed through the mobile core network 105 may improve a user experience of a user of the user device 120, and improve performance of the user device 120, by taking advantage of increased performance of the external antenna 108 and multiple connection options (e.g., the radio access network 112 and the satellite 116) available to the mobile core network 105 and which may not be otherwise available to the user device 120. In some examples, the user device 120 may communicate with the mobile core network 105A or the mobile core network 105B. For example, the mobile core network 105B may provide redundancy for the mobile core network 105A, and vice versa. In some examples, the mobile core network 105A and the mobile core network 105B perform load balancing such that each of the mobile core network 105A and the mobile core network 105B supports a portion of communication between the train 102 and the macro core network 114.

In some examples, multiple bonded connections may be formed between the train 102 and the macro core network 114, such as via the radio access network 112. The bonded connections may increase data throughput between the train 102 and the macro core network 114. In some examples, connections between the train 102 and the macro core network 114 may be considered "make before break." For example, pursuant to a "make before break" connection scheme, prior to breaking or terminating an existing connection between the train 102 and the macro core network 114, a new connection should be established and stable between the train 102 and the macro core network 114. In this way, uninterrupted communication may be provided between the train 102 (and therefore user device 120) and the macro core network 114. In some examples, it may not be possible to maintain a "make before break" connection scheme relying on terrestrial communication, such as the radio access network 112. In such examples, the mobile core network 105 may attempt to connect to the macro core network 114 via an alternative form of communication, such as the satellite 116. In some examples in which the "make before break" connection scheme cannot be followed due to network conditions, the mobile core network 105 and the macro core network 114 may establish (e.g. authenticate and provision) a new communication session when network conditions allow.

A connection between the train 102 and the macro core network 114 via the satellite 116 may, in some examples, have lower throughput, lower speed, etc., than a connection between the train 102 and the macro core network 114 via the radio access network 112. Similarly, the radio access network 112 may have an increased level of trust or security than does the satellite 116. For example, the radio access network 112, and backhaul communication between the radio access network 112 and the macro core network 114 may be controlled by an operator of the macro core network 114. In contrast, the operator of the macro core network 114 may have less, or no, control over the satellite 116 or data flowing from the satellite 116 to the macro core network 114. Because of this, the mobile core network 105 may reduce a data communication capability of the user device 120 during times in which the train 102 is communicatively coupled to the macro core network via the satellite 116 (or another avenue of communication which is untrusted). The reduced capability may limit what types of data are transmitted, such as preventing the transmission of sensitive data, user data, personally identifying information, or any other information having a nature encompassed within a security policy of the mobile core network 105 or applicable to the user device 120. In some examples, the mobile core network 105 may split and transmit data to the macro core network 114 via multiple paths, at least one of which is untrusted, thereby increasing security of the data. For example, a malefactor intercepting a part of the data via a first transmission path may find the data of low value, and in some cases relatively useless, without also intercepting a remainder of the data via other transmission paths. In some examples, the mobile core network 105 has knowledge of a route of the train 102 and of RF signal strength along that route. In such examples, the mobile core network 105 may precondition a handover of communication between the train 102 and the macro core network 114 predictively, mitigating the possibility of a loss of communication between the train 102 and the macro core network 114 while communication is transitioned between a channel being broken and a channel being made.

In some examples, track-side infrastructure may be utilized to provide backhaul communication between the train 102 and the macro core network 114. Use of this track-side infrastructure may mitigate reliance on service coverage provided by the radio access network 112 and/or the satellite 116. For example, via the directional antennas 110, the mobile core network 105 may exchange data with line-of-sight devices 118 positioned alongside a track on which the train 102 is traveling and which are communicatively coupled to the macro core network 114, such as via a fiber optic cable, copper, or other hardwired coupling.

As described above, the user device 120 may communicate with the mobile core network 105. For example, via the internal antennas 106B-1 and/or 106B-2, the user device 120 communicates with the mobile core network 105. In some examples, the communication is local within the train 102. For example, the mobile core network 105 may provide edge functionality to the user device 120. In some examples, the edge functionality is built or incorporated into the mobile core network 105. In other examples, the edge functionality is implemented by another device (not shown), such as an edge server, communicatively coupled to the mobile core network 105 and located on the train 102, such as in a terminating car 104. For example, an edge server (not shown) may store content that is served to the user device 120 based on control of the mobile core network 105. The edge functionality may serve content to the user device 120 without relying on a data or network connection between the user device 120 and the macro core network 114. The content may be any suitable digital content, the scope of which is not limited herein, and may be cached or otherwise stored by the mobile core network 105 for providing to the user device 120.

In some examples, the user device 120 is a device such as a smart phone, a tablet device, a wearable device, a computing device (e.g., laptop, notebook, netbook, etc.). In other examples, the user device is an Internet of Things (IoT) device of the train, such as an appliance, a sensor, a monitor, or the like. In some examples, the mobile core network 105 exerts a degree of control over the user device 120 via one or more profiles programmed to the user device 120. For example, the mobile core network 105 may control the user device 120, via the policies, to prevent the user device 120 from directly connecting to the macro core network 114 via the radio access network 112 while a first policy is active. Correspondingly, while the first policy is active, the mobile core network 105 may control the user device 120, via the policies, to connect to the macro core network 114 through the mobile core network 105.

Multiple policies are possible, and a plurality of the policies may be active at any given time, with a hierarchy established for compliance by the user device 120 with the policies. For example, the mobile core network 105 may control the user device 120, via the policies, to cause the user device 120 to connect to the mobile core network 105 via Wi-Fi communication, rather than 5G communication. In another example, the mobile core network 105 may control the user device 120, via the policies, to connect to the macro core network 114 via a fastest communication method available to the user device 120 at a given time, or via a strongest communication signal available to the user device 120 at a given time. In another example, the mobile core network 105 may control the user device 120, via the policies, to connect to the macro core network 114 via a path determined based on a geographic location of the user device 120 (and therefore the train 102). The mobile core network 105 may control the user device 120, via the policies, to connect to the macro core network 114, or not connect to the macro core network 114, based on a subscription or purchase plan with which the user device 120 is associated.

For example, the mobile core network 105 may support a roaming architecture, as specified by standard in the telecommunications industry. However, the user device 120 may not be permitted to roam based on a subscription plan to which the user device 120 is associated. In such examples, or in any other examples in which the user device 120 may be prohibited from connecting to the macro core network 114, the mobile core network 105 may control the user device 120, via the policies, to permit local communication within the train 102 (e.g., to receive edge content from the mobile core network 105, to communicate within the train 102, if permitted based on security policies and functionality provided by the mobile core network 105, and to perform other such local actions) while prohibiting connection to the macro core network 114.

In some examples, to implement the control of the user device 120 by the mobile core network 105, a tSIM is provided. In some examples, an operator of the train 102 provides an application (not shown) which may be installed on the user device 120. By interacting with the application, a user may control the application to cause the user device 120 to be programmed with an eSIM. For example, the user may control the application to cause an eSIM based on the tSIM to be set as a primary eSIM of the user device 120. Based on this eSIM, the mobile core network 105 may exert control over the user device 120, such as setting policies specific to the user device 120. In other examples, the tSIM may be a physical SIM card that may be placed in the user device 120, such as within a removable SIM card tray of the user device 120. In some examples, the tSIM may cause the user device 120 to prioritize communication via the mobile core network 105 over communication via other paths.

In some examples, the mobile core network 105 may facilitate data collection and/or analysis. For example, a wireless communication network may be tested to determine service levels at given geographic locations (e.g., a strength of an RF signal received at a particular location having been transmitted by the radio access network 112 and/or a strength of an RF signal transmitted from a particular location having been received by the radio access network 112). Given its mobile nature, the train 102 may provide a useful platform for performing such testing. Further, because train tracks often parallel, either directly or within nearby proximity, other transportation avenues, such as rivers, highways, etc., quality of service and signal strength as determined by the train along the train tracks may be a suitable proxy for the quality of service and signal strength at or on those other transportation avenues. As such, as the train 102 travels, the mobile core network 105 may perform testing to build a database for use in forming a service map of wireless communication service along a route of the train 102.

In some examples, different trains may have different complexities of communication systems. For example, a passenger train, such as the train 102, may include the mobile core network 105, but a freight train may not include a mobile core network 105. Thus, the freight train may have limited options for transmitting data, such as telemetry data, IoT data, sensor data, or the like to a recipient. In some examples, data transfer may occur between trains, or between a static device which the train 102 passes and the train 102. For example, a freight train may include sensors, tracking devices, or other electronics having associated radio frequency identification (RFID) tags. As the freight train and the train 102 pass, the mobile core network 105, via a RFID reader (not shown) may interrogate the freight train to obtain data from the RFID tags of the freight train. The mobile core network 105 may then transmit the received data to a destination, or may store the data for later transmission, such as based on a strength or quality of an available communication connection. In another example, the freight train and the train 102 may not directly pass. Instead, the freight train may pass a stationary object which includes RFID functionality and which may obtain and store the RFID data from the freight train. Subsequently, the train 102 may pass the stationary object and acquire the RFID data, transmitting or storing the RFID data as described above in the examples in which the RFID data is received directly from the freight train.

In some examples, the train 102 stores the data responsive to a signal strength of a connection between the mobile core network 105 and the macro core network 114 being less than a threshold amount. The mobile core network 105 may wait to transmit the RFID data to the macro core network 102 until the signal strength of the connection is greater than the threshold amount. In some examples, data transmission from the mobile network code 105 to the macro core network 114 is prioritized. For example, high priority data may be transmitted as soon as possible, using whatever suitable transmission path is available at an earliest point in time, despite that transmission path potentially having higher associated cost. For example, high priority data may be transmitted by the mobile core network 105 to the macro core network 114 via the satellite 116 when a signal strength between the mobile core network 105 and the radio access network 112 is less than the threshold amount. Conversely, low priority data may be stored or cached by the mobile core network 105 responsive to the signal strength between the mobile core network 105 and the radio access network 112 being less than the threshold amount. Responsive to the mobile core network 105 determining that the signal strength between the mobile core network 105 and the radio access network 112 is greater than or equal to the threshold amount, the mobile core network 105 may transmit the low priority data to the macro core network via the radio access network 112. In some examples, a slice may be defined through the macro core network 114 and/or the mobile core network 105 to facilitate the communication of data between the macro core network 114 and the mobile core network 105, or between the micro core network 105 and an application server (not shown) via the macro core network 114. In an example, data received from the train 102 may be provided to the application server for processing, such as to perform customer or performance analytics, train machine learning algorithms, or perform any other operations on, or using, the data. In some examples, the macro core network 114 is modified to include additional functionality, such as additional network exposure elements, to facilitate this functionality.

In some example, the mobile core network 105 determines analytics based on content requested or obtained by the user device 120 (or other user devices 120). For example, the mobile core network 105 may determine a frequency with which a certain for of content is accessed by the user device 120, or a volume of user devices 120 that access the content, via the macro core network 114. Responsive to the frequency or volume exceeding a threshold, the mobile core network 105 may cache or download the content to the train 102, such as to the mobile core network 105, to an edge server, or the like. In some examples, the mobile core network 105 may cache or download the content based on perceived relevance, expected popularity, or other analytics not determined by the mobile core network 105. In some examples, the mobile core network 105 may cache or download the content responsive to the signal strength between the mobile core network 105 and the radio access network 112 being greater than or equal to the threshold amount. In other examples, the mobile core network 105 may cache or download the content responsive to the train 102 being stationary, such as at a train station. In yet other examples, the mobile core network 105 may cache or download the content responsive to the availability of line-of-sight communication, as described above.

Figure 2:
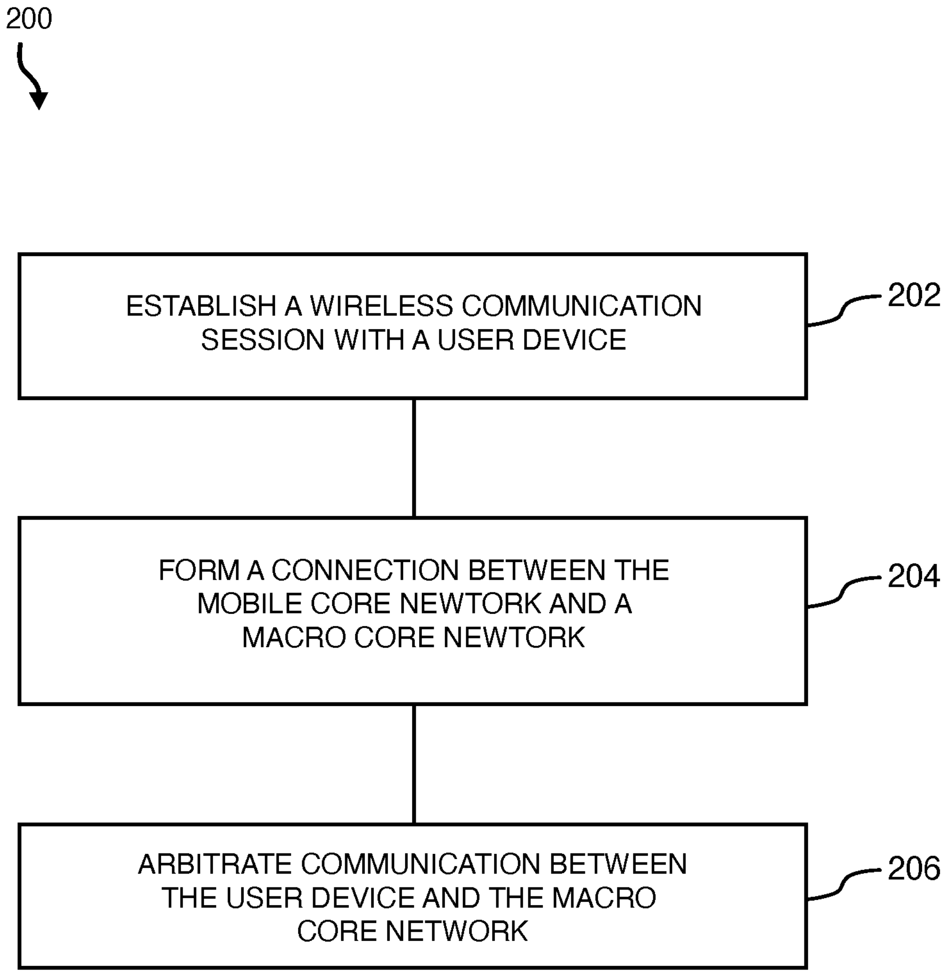
FIG. 2 is a flowchart of a method according to an example of the disclosure.

FIG. 2 is a flowchart of a method 200 of communication arbitration, in accordance with various examples. In some examples, the method 200 is implemented by a mobile core network, such as the mobile core network 105, as described above. The method 200 may be implemented to arbitrate communication between a user device, such as the user device 120, and a macro core network, such as the macro core network 114, such that the mobile core network operates as a relay between the user device and the macro core network.

At operation 202, a wireless communication session is established with a user device. In some examples, the wireless communication session is established within a local, or private, network. In some examples, the wireless communication session is established between the user device and the mobile core network. The user device and the mobile core network may be co-located, such as in a same building, same transportation vehicle, or the like. In an example, the user device is located in a first car of a train and the mobile core network is located in a second car of the train. The wireless communication session may be established with the mobile core network according to any suitable process, which is not limited herein. In some examples, the wireless communication session is established with the mobile core network in a same manner as the wireless communication session would be established directly with the macro core network. In some examples, the user device communicates with the macro device via an access point, such as a 5G access point, a Wi-Fi access point, or the like.

In some examples, establishing the wireless communication session between the user device and the mobile core network includes authenticating the user device into first or second states. In the first state, the mobile core network grants the user device access to a local network. While accessing the local network, the user device may access local content served by the mobile core network, but may be prohibited from accessing the macro core network via a backhaul provided by the mobile core network. In the second state, the mobile core network grants the user device access to the local network, as well as access to the macro core network via a backhaul provided by the mobile core network.

At operation 204, a connection is formed between the mobile core network and a macro core network. In some examples, the connection is via a terrestrial RAN associated with the macro core network, and through which the user device may connect to the macro core network in the absence of the mobile core network. In other examples, the connection is via satellite communication. In other examples, the connection is via a terrestrial line of sight communication system.

In some examples, multiple connections may be formed and may simultaneously exist. At least some of the connections may be bonded to increase throughput between the mobile core network and the macro core network. In some examples, connections may be formed via multiple modalities (e.g., terrestrial RAN, satellite, and line of sight) to provide redundancy and failover protection against failure of one or more of the connections. For example, responsive to a signal strength of a connection via the terrestrial RAN decreasing to be less than a threshold amount, communication flow between the mobile core network and the macro core network may failover to the satellite communication and/or the line of sigh communication. In such failover situations, some data may be cached or held for later transmission responsive to the signal strength of the connection via the terrestrial RAN increasing to be greater than a threshold amount.

In some examples, the connections may be made according to a "make before break" connection scheme. In such an example, before a connection via one modality is broken, another connection, via the same modality or another modality, may be formed. For example, before a connection with the terrestrial RAN via a first access point is broken, a connection with the terrestrial Ran via a second access point may be made. Similarly, before a connection with the terrestrial RAN is broken, a connection via a satellite may be formed. In this way, continuity of communication between the mobile core network and the macro core network may be maintained.

At operation 206, communication is arbitrated between the user device and the macro core network. In some examples, responsive to the establishment of the wireless communication session between the user device and the mobile core network, the mobile core network prevents the user device from forming a wireless communication session directly with the macro core network via the terrestrial RAN. For example, via a local RAN or other access points, the user device communicates with the mobile core network. The mobile core network may aggregate data from the user device with other data, such as sensor data, analytical data, data from other user devices, or the like, and transmit the aggregated data to the macro core network. The transmission may be through any suitable connection available to the mobile core network, such as the terrestrial RAN, satellite, or light of sight communication system, as described elsewhere herein. The mobile core network may subsequently receive aggregated data including data designated for the user device and provide the data to the user device via the local RAN or access points. In some examples, the mobile core network may control the user device, such as via a communication profile, tSIM, eSIM, or other setting of the user device, to allow the user device to form a connection directly with the macro core network via the terrestrial RAN responsive to a signal strength between the terrestrial RAN and the user device being greater than a threshold amount, the user device being located in a particular geographic area, or the like.

Figure 3:
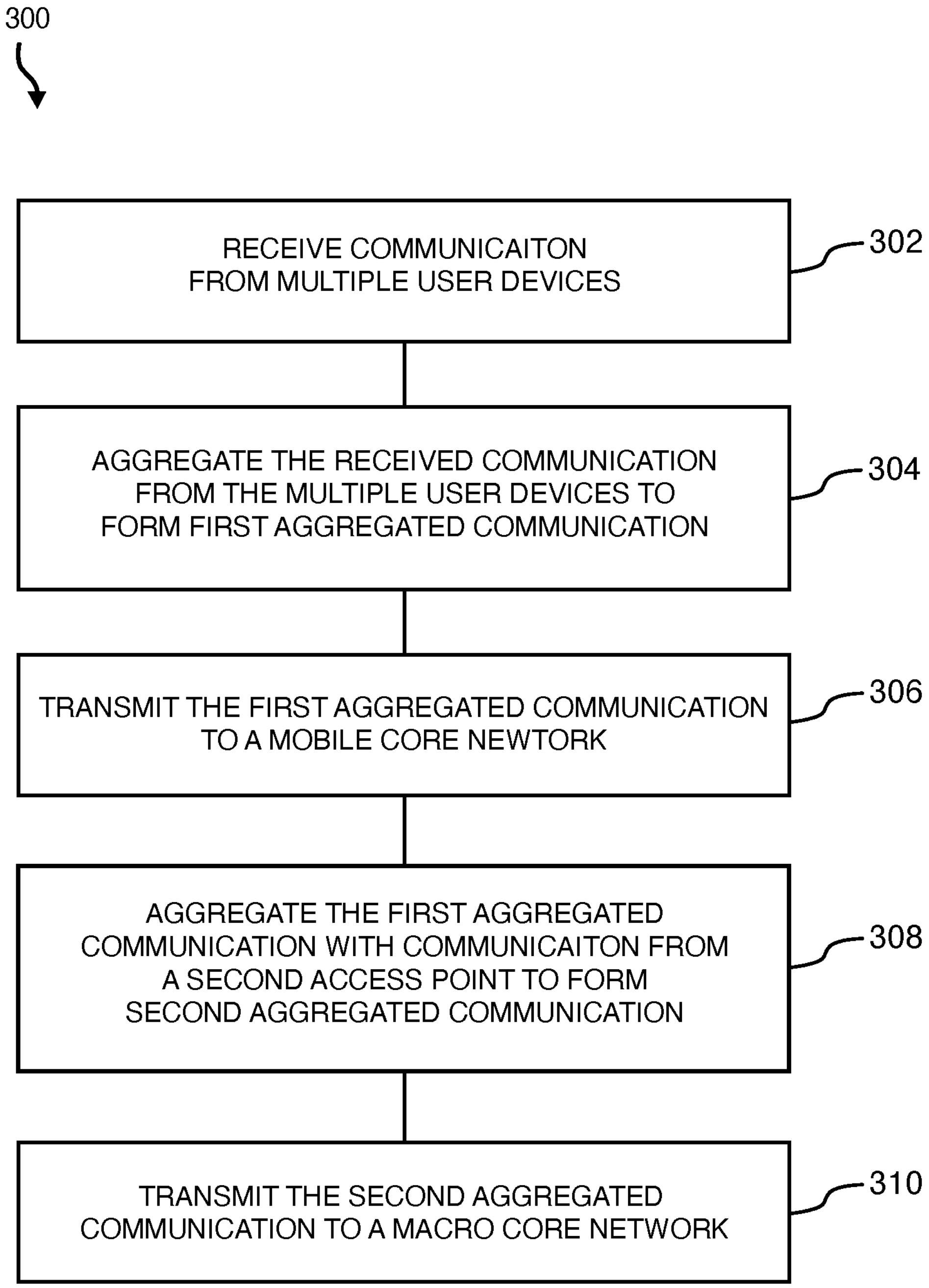
FIG. 3 is a flowchart of a method according to an example of the disclosure.

FIG. 3 is a flowchart of communication management, in accordance with various examples. In some examples, the method 300 is implemented in a communication system, such as the communication system 100, as described above. The method 300 may be implemented to arbitrate communication between a user device, such as the user device 120, and a macro core network, such as the macro core network 114, such that a mobile core network, such as the mobile core network 105, operates as a relay between the user device and the macro core network.

At operation 302, an access point receives communication from multiple user devices. In some examples, the access point is located in a same transportation vehicle as the mobile core network, or in a separate compartment from the mobile core network in a multi-compartment vehicle. In some examples, the user device communicates with the access point via one or more antennas located in the transportation vehicle. In various examples, the access point is a 5G access point, a Wi-Fi access point, a Bluetooth access point, a millimeter wave access point, or an access point according to any other communication standard or protocol.

At operation 304, the access point aggregates the received communication from the multiple user devices to form first aggregated communication. In some examples, the access point aggregates the received communication to improve a user experience in transmitting data to the mobile core network. For example, the access point may aggregate the received communication to provide the first aggregated communication over a high-speed link between the access point and the mobile core network.

At operation 306, the access point transmits the first aggregated communication to the mobile core network. The transmission may be over a backhaul link or channel between the access point and the mobile core network. In some examples, the transmission is via a fiber optic coupling between the access point and the mobile core network. In other examples, the transmission is via a wireless transmitter, such as a millimeter wave transmitter.

At operation 308, the mobile core network aggregates the first aggregated communication with communication from a second access point to form second aggregated communication. In some examples, the mobile core network aggregates the communication to improve a user experience in transmitting data to the macro core network. For example, the mobile core network may have access to higher powered transmission, increased quality antennas, or other improved hardware resources in comparison to the user device. By aggregating data from multiple user devices at the mobile core network and transmitting the aggregated data from the mobile core network to the macro core network, throughput, latency, and a range of communication are, in some examples, improved in comparison to an individual user device of the multiple user devices connecting directly to the macro core network via a terrestrial RAN.

At operation 310, the mobile core network transmits the second aggregated communication to the macro core network. The transmission may be over a backhaul link or channel between the mobile core network and the macro core network. In some examples, the transmission is via a terrestrial RAN associated with the macro core network. In other examples, the transmission is via a satellite. In other examples, the transmission is via a line of sight communication system, such as a system that communicates via radio frequency (RF) signals from the communication system to a receiver coupled to a fiber optic cable providing connectivity to the macro core network. In some examples, the mobile core network may transmit the second aggregated communication via two or more backhaul links. In some examples, the mobile core network may transmit a first portion of the second aggregated communication at a first time, such as via a first backhaul link, and transmit a second portion of the second aggregated communication at a second time, such as via a second backhaul link.

Figure 4:
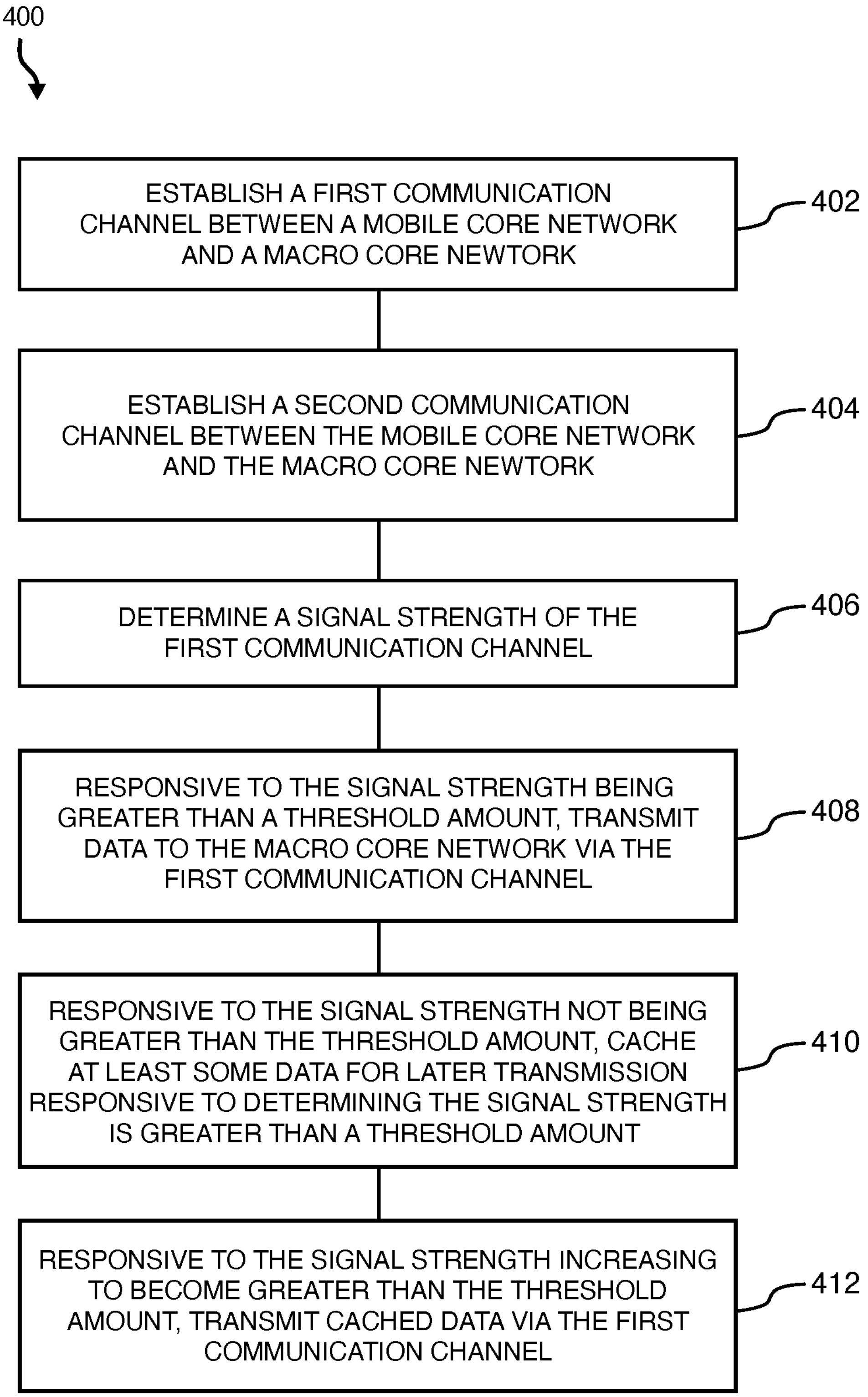
FIG. 4 is a flowchart of a method according to an example of the disclosure.

FIG. 4 is a flowchart of a method 400 of communication channel management, in accordance with various examples. In some examples, the method 400 is implemented by a mobile core network, such as the mobile core network 105, as described above. The method 400 may be implemented to establish one or more communication channels with a macro core network, such as the macro core network 114.

At operation 402, a first communication channel is established between the mobile core network and the macro core network. In some examples, the first communication channel is via a terrestrial RAN, such as via a first access point of the terrestrial RAN. In some examples, multiple connections may be formed between the mobile core network and the terrestrial RAN, such as via the same or multiple access points, and at least some of these connections may be bonded.

At operation 404, a second communication channel is established between the mobile core network and the macro core network. In some examples, the second communication channel may be any one of a second connection via the terrestrial RAN, such as via a second access point of the terrestrial RAN, a connection via a satellite, or a connection via a line of sight communication system. In some examples, the second communication channel operates substantially in parallel with the first communication channel, such as for load balancing, failover, providing a particular Quality of Service (QoS), or any other suitable purpose. In other examples, the second communication channel is established responsive to an expected, or detected, decrease in signal strength or quality of the first communication channel. In yet other examples, the second communication channel is established responsive to a planned breaking of the first communication channel. In this way, establishment of communication channels between the mobile core network and the macro core network may follow a “make before break” scheme in which a second communication channel, or more generally a replacement channel, is established prior to the termination, teardown, or breaking of the first communication channel.

At operation 406, the mobile core network determines a signal strength of the first communication channel. At operation 408, responsive to the signal strength being greater than a threshold amount, the mobile core network may transmit data to the macro core network via the first communication channel. At operation 410, responsive to the signal strength not being greater than the threshold amount, the mobile core network may cache at least some data for later transmission responsive to determining that the signal strength is greater than the threshold amount. In some examples, responsive to the signal strength not being greater than the threshold amount, the mobile core network may transmit at least some data via the second communication channel. For example, the mobile core network may transmit heartbeat or keep-alive signals via the second communication channel, may transmit high priority data via the second communication channel, or may transmit any other data not suitable for caching for later transmission. At operation 412, responsive to the signal strength increasing to become greater than the threshold amount, the mobile core network may transmit cached data that has previously been held for later transmission to the macro core network via the first communication channel.

Figure 5:
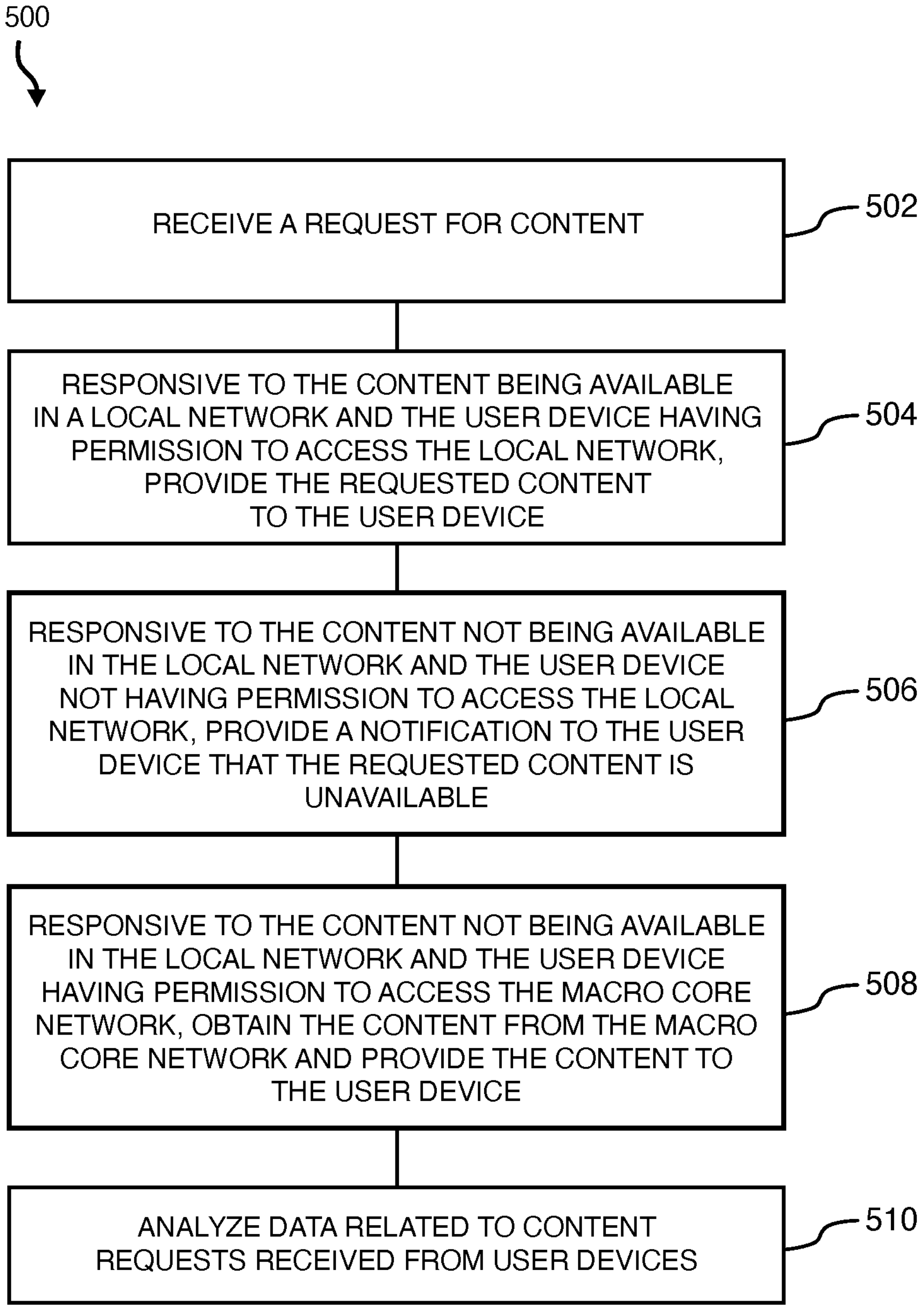
FIG. 5 is a flowchart of a method according to an example of the disclosure.

FIG. 5 is a flowchart of a method 500 of providing content, in accordance with various examples. In some examples, the method 500 is implemented in a communication system, such as the communication system 100, as described above. The method 500 may be implemented to provide content to a user device, such as the user device 120. The content may be provided by a mobile core network, such as the mobile core network 105, by an edge device, or by a macro core network, such as the macro core network 114, via the mobile core network.

At operation 502, the mobile core network receives a request for content. In some examples, the request for content may be received from a user device. Responsive to receiving the request for content, the mobile core network may determine a permission or authentication level of the user device. The mobile core network also determines whether the requested content is available in a local network, such as cached or stored at the mobile core network, an edge device, or another server co-located with the mobile core network.

At operation 504, responsive to the content being available in the local network and the user device having permission to access the local network, the mobile core network provides the requested content to the user device. In some examples, the content is provided as a one-time file transfer. In other examples, the content is provided over time, such as streaming, hosted by the mobile core network, the edge server, or any other suitable component in the local network. Generally, the content may be provided in the local network according to any suitable content delivery scheme, the scope of which is not limited herein.

At operation 506, responsive to the content not being available in the local network and the user device not having permission to access the macro core network, the mobile core network provides a notification to the user device that the requested content is undeliverable. In some examples, the notification may include a prompt for a user device to subscribe or otherwise barter for increased permissions, such as to access the content via the macro core network.

At operation 508, responsive to the content not being available in the local network and the user device having permission to access the macro core network, the mobile core network obtains the content from the macro core network and provides the content to the user device. In some examples, the content is obtained and provided as a one-time file transfer. In other examples, the content is obtained and provided over time, such as streaming. Generally, the content may be obtained and provided according to any suitable content delivery scheme, the scope of which is not limited herein.

At operation 510, the mobile core network analyzes data related to content requests received from user devices. In some examples, the mobile core network may further receive or access information from the macro core network related to expected or historical popularity of certain content. Based on the data analysis and/or the received information, the mobile core network may obtain certain content indicated as frequently requested by user devices, having a historical popularity, having a high expected popularity, or the like, from the macro core network. The mobile core network may cache or store this content, such as in the edge device, to enable the mobile core network to provide the content locally to a user device, without accessing the macro core network responsive to receiving a request for the content.

Figure 6:
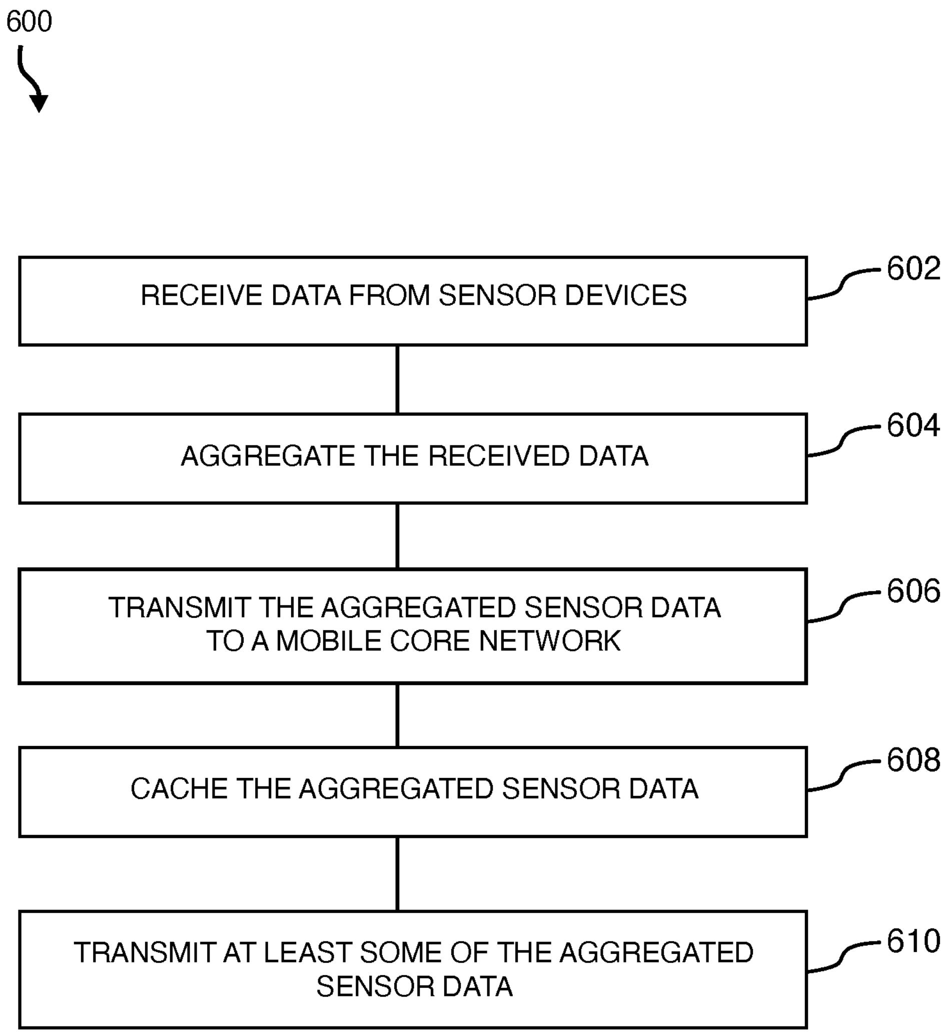
FIG. 6 is a flowchart of a method according to an example of the disclosure.

FIG. 6 is a flowchart of a method 600 of data management, in accordance with various examples. In some examples, the method 600 is implemented by a mobile core network, such as the mobile core network 105, as described above. The method 600 may be implemented to collect and manage data, such as sensor data.

At operation 602, data is received from sensor devices. In some examples, a user device, such as the user device 120, may be a sensor device, a device that provides sensor data, an Internet of Things (IoT) device, or the like. In some examples, the data is received by an access point. The data may be telemetry data, cargo inventory data, communication analytical data, environmental data, or any other suitable form of data.

At operation 604, the received data is aggregated. For example, the access point may aggregate the sensor data received from multiple sensor devices to form a single data package.

At operation 606, the aggregated sensor data is transmitted to the mobile core network. In some examples, the mobile core network is located in a same transportation vehicle, such as a train, as the access point. The mobile core network may also be located in the same transportation vehicle as at least some of the sensor devices. In other examples, the mobile core network is located in a different transportation vehicle than at least some of the sensor devices.

At operation 608, the mobile core network caches the aggregated sensor data. In some examples, the mobile core network caches the aggregated sensor data to enable the mobile core network to later aggregate the aggregated sensor data with other sensor data to form second aggregated sensor data. The mobile core network may also cache the aggregated sensor data to facilitate subsequent transmission of at least some of the sensor data by the mobile core network. The mobile core network may also cache the aggregated sensor data to facilitate subsequent analysis by the mobile core network of at least some of the aggregated sensor data.

At operation 610, the mobile core network transmits at least some of the aggregated sensor data. For example, the mobile core network may determine a signal strength of a connection between the mobile core network and a macro core network. Responsive to the signal strength being less than a threshold amount, the mobile core network may retain the aggregated sensor data for later transmission to the macro core network. Responsive to the signal strength not being less than the threshold amount, the mobile core network may transmit the aggregated sensor data to the macro core network.

In some examples, the mobile core network identifies a first portion of the aggregated sensor data as high priority data. In some examples, the high priority data may be telemetry data. The mobile core network may further identify a second portion of the aggregated sensor data as low priority data. Responsive to the signal strength of the connection between the mobile core network and the macro core network being less than a threshold amount, the mobile core network may transmit the high priority data via a second modality or connection between the mobile core network and the macro core network.

Figure 7:
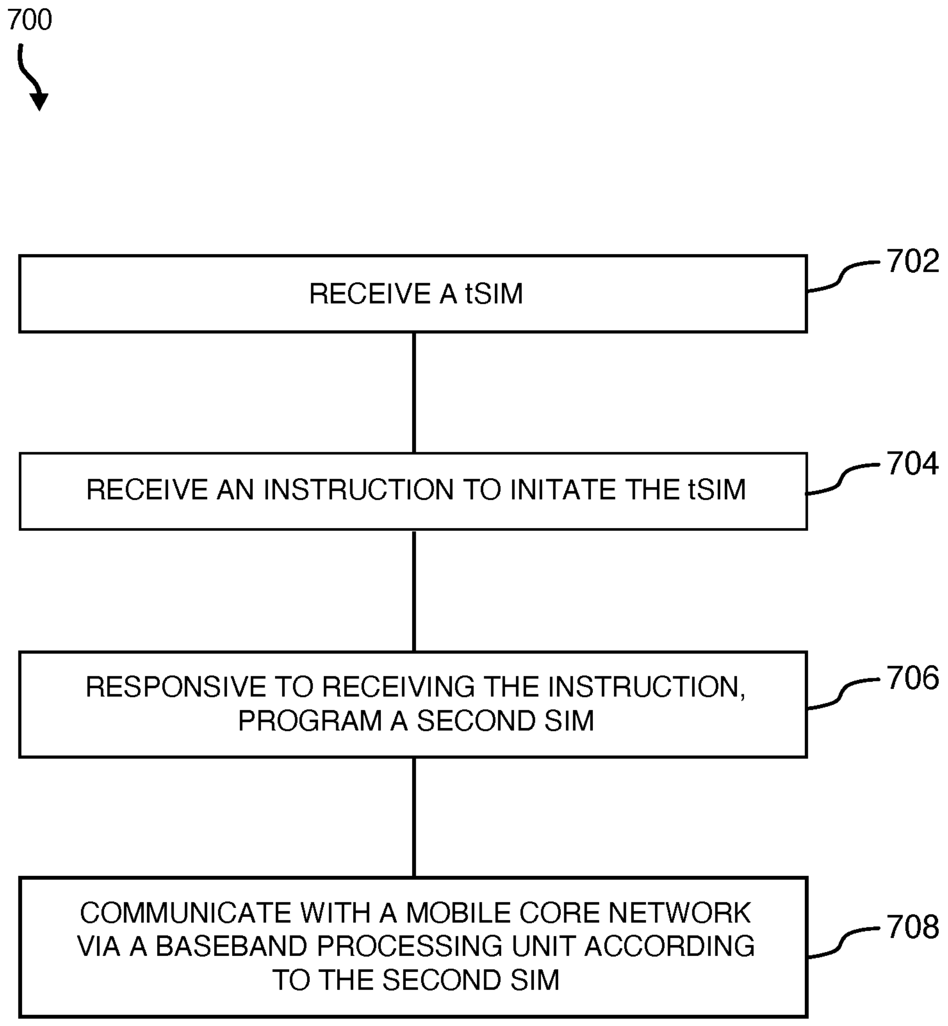
FIG. 7 is a flowchart of a method according to an example of the disclosure.

FIG. 7 is a flowchart of a method 700 of controlling a user device according to a tSIM, in accordance with various examples. In some examples, the method 700 is implemented by a user device, such as the user device 120, as described above. The method 700 may be implemented to, for example, program or control baseband communication functionality of the user device based on the tSIM, create an eSIM having one or more profiles, cause the user device to switch between profiles of an eSIM, or the like.

At operation 702, the user device receives a tSIM, as described above. In some examples, the user device receives the tSIM via electronic communication, such as an email, a test message, or the like. In other examples, the user device receives the tSIM as an instruction or hyperlink to download the tSIM. In yet other examples, the user device receives the tSIM in an application executable on the user device. In an example, at a time of receiving the tSIM, the user device is programmed or configured to communicate with a macro core network via a baseband processing unit of the user device according to a first subscriber identity module (SIM). In some examples, the user device receives the tSIM responsive to a user of the user device purchasing a ticket for an activity, such as transportation on a moving platform or entry into a particular location. In other examples, the user device receives the tSIM responsive to the user of the user device purchasing a subscription, access, or other permissions which are granted at least in part based on the tSIM.

At operation 704, the user device receives an instruction to initiate the tSIM. In some examples, the instruction, or command, to initiate the tSIM is provided by a user. In other examples, the instruction is automatically generated based on a detected location of the user device, a detected route of travel of the user device, the user device detecting the availability of a network or access point having a signal strength greater than a threshold amount, or any other suitable triggering event.

At operation 706, responsive to receiving the instruction, the user device programs a second SIM on the user device. In an example, the second SIM is an electronic SIM (eSIM). In an example, programming the second SIM programs, or controls, the baseband processing unit to communicate with a mobile core network. In an example, the second SIM includes multiple profiles based on the tSIM. For example, a first profile may disable first functionality and create second functionality of the user device. A second profile may enable the first functionality and disable the second functionality. A third profile may enable the first functionality and enable third functionality. Generally, the profiles may include any modifications to functionality of the user device, the scope of which is not limited herein.

In an example, at least one of the profiles causes the user device to prioritize data communication with the mobile core network higher than with the macro core network. In an example, at least one of the profiles causes the user device to receive access to a local network provided by the mobile core network while retaining access to the macro core network for a data connection of the user device. In an example, at least one of the profiles causes the user device to receive access to the local network provided by the mobile core network and receive access to the macro core network through the mobile core network operating as a relay between the user device and the macro core network. In some examples, the user device switches between profiles of the second SIM based on received instructions or commands. In some examples, the instructions or commands are user-generated. In other examples, the instructions or commands are automatically generated based on a detected location of the user device, a detected route of travel of the user device, the user device detecting the availability of a network or access point having a signal strength greater than a threshold amount, or any other suitable triggering event.

At operation 708, the user device communicates with the mobile core network via the baseband processing unit and according to the second SIM. In some examples, the user device is incapable of communicating with the mobile core network via the first SIM. In some examples, the user device communicates with the mobile core network in place of the macro core network, such as resulting from an active profile of the second SIM prioritizing data communication with the mobile core network higher than data communication with the macro core network. In such examples, the user device may retain a connection to the macro core network for voice communication. In some examples, the user device communicates with the mobile core network to access local content via a local network provided by the mobile core network without receiving access to the macro core network through the mobile core network. In other examples, the user device communicates with the mobile core network to communicate with the macro core network through the mobile core network operating as a relay.

Figure 8:
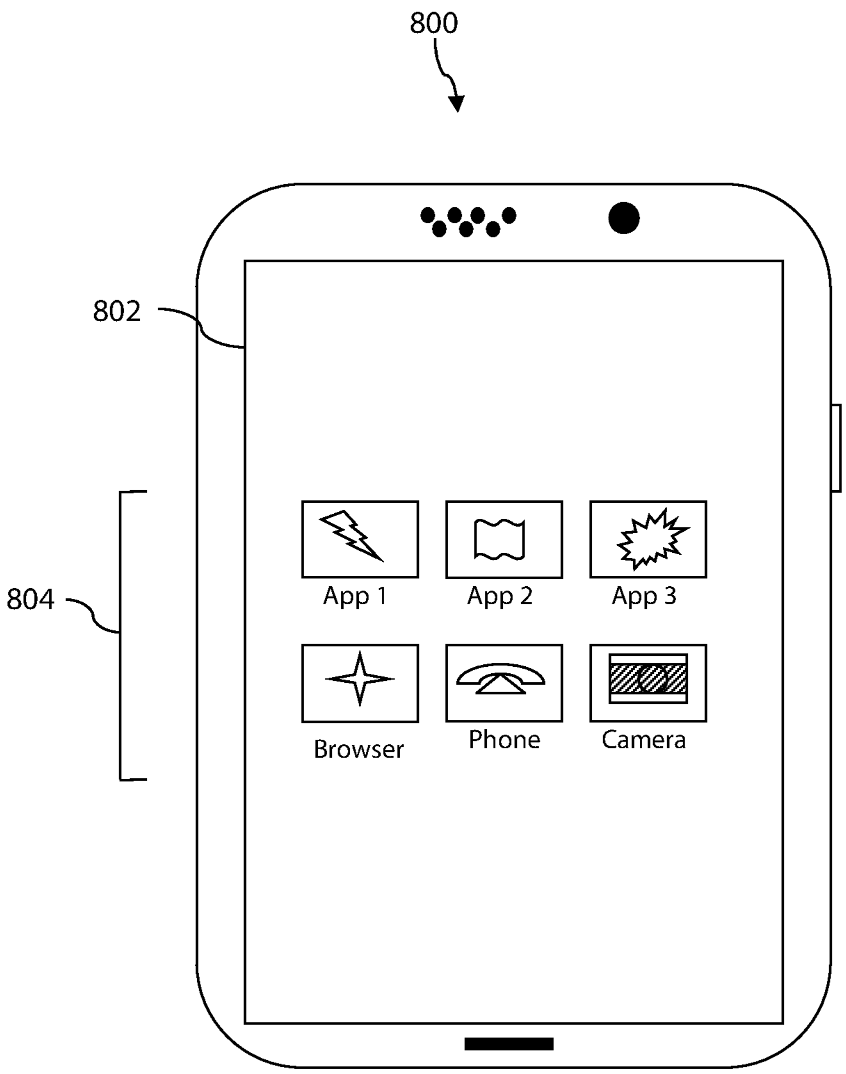
FIG. 8 is a block diagram of a user equipment according to an example of the disclosure.

FIG. 8 depicts the user equipment (UE) 800, which is operable for implementing aspects of the present disclosure, but the present disclosure should not be limited to these implementations. Though illustrated as a mobile phone, the UE 800 may take various forms including a wireless handset, a pager, a personal digital assistant (PDA), a gaming device, or a media player. The UE 800 includes a touchscreen display 802 having a touch-sensitive surface for input by a user. A small number of application icons 804 are illustrated within the touch screen display 802. It is understood that in different embodiments, any number of application icons 804 may be presented in the touch screen display 802. In some embodiments of the UE 800, a user may be able to download and install additional applications on the UE 800, and an icon associated with such downloaded and installed applications may be added to the touch screen display 802 or to an alternative screen. The UE 800 may have other components such as electro-mechanical switches, speakers, camera lenses, microphones, input and/or output connectors, and other components as are well known in the art. The UE 800 may present options for the user to select, controls for the user to actuate, and/or cursors or other indicators for the user to direct. The UE 800 may further accept data entry from the user, including numbers to dial or various parameter values for configuring the operation of the handset. The UE 800 may further execute one or more software or firmware applications in response to user commands. These applications may configure the UE 800 to perform various customized functions in response to user interaction. Additionally, the UE 800 may be programmed and/or configured over-the-air, for example from a wireless base station, a wireless access point, or a peer UE 800. The UE 800 may execute a web browser application which enables the touch screen display 802 to show a web page. The web page may be obtained via wireless communications with a base transceiver station, a wireless network access node, a peer UE 800 or any other wireless communication network or system.

Figure 9:
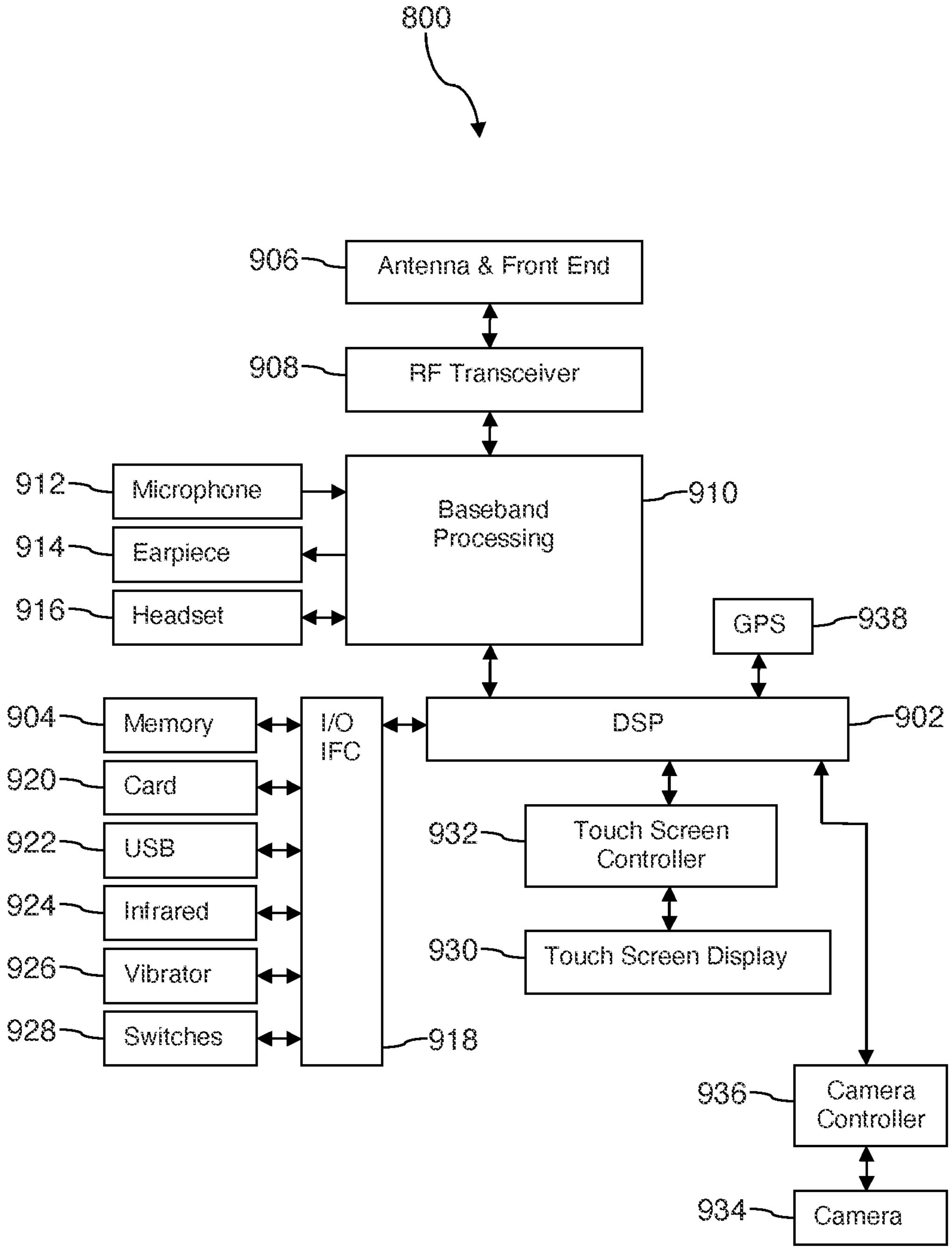
FIG. 9 is a block diagram of a user equipment according to an example of the disclosure.

FIG. 9 shows a block diagram of the UE 800. While a variety of known components of handsets are depicted, in an embodiment a subset of the listed components and/or additional components not listed may be included in the UE 800. The UE 800 includes a digital signal processor (DSP) 902 and a memory 904. As shown, the UE 800 may further include one or more antenna and front end unit 906, a one or more radio frequency (RF) transceiver 908, a baseband processing unit 910, a microphone 912, an earpiece speaker 914, a headset port 916, an input/output interface 918, a removable memory card 920, a universal serial bus (USB) port 922, an infrared port 924, a vibrator 926, one or more electro-mechanical switches 928, a touch screen display 930, a touch screen controller 932, a camera 934, a camera controller 936, and a global positioning system (GPS) receiver 938. In an embodiment, the UE 800 may include another kind of display that does not provide a touch sensitive screen. In an embodiment, the UE 800 may include both the touch screen display 930 and additional display component that does not provide a touch sensitive screen. In an embodiment, the DSP 902 may communicate directly with the memory 904 without passing through the input/output interface 918. Additionally, in an embodiment, the UE 800 may comprise other peripheral devices that provide other functionality.

The DSP 902 or some other form of controller or central processing unit operates to control the various components of the UE 800 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the UE 800 to function as a peripheral device to exchange information with a personal computer or other computer system. The infrared port 924 and other optional ports such as a Bluetooth® interface or an IEEE 802.11 compliant wireless interface may enable the UE 800 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 908 may comprise a near field communication (NFC) transceiver. The NFC transceiver may be used to complete payment transactions with point-of-sale terminals or other communications exchanges. In an embodiment, each of the different radio transceivers 908 may be coupled to its own separate antenna. In an embodiment, the UE 800 may comprise a radio frequency identify (RFID) reader and/or writer device.

The switches 928 may couple to the DSP 902 via the input/output interface 918 to provide one mechanism for the user to provide input to the UE 800. Alternatively, one or more of the switches 928 may be coupled to a motherboard of the UE 800 and/or to components of the UE 800 via a different path (e.g., not via the input/output interface 918), for example coupled to a power control circuit (power button) of the UE 800. The touch screen display 930 is another input mechanism, which further displays text and/or graphics to the user. The touch screen LCD controller 932 couples the DSP 902 to the touch screen display 930. The GPS receiver 938 is coupled to the DSP 902 to decode global positioning system signals, thereby enabling the UE 800 to determine its position.

Figure 10A:
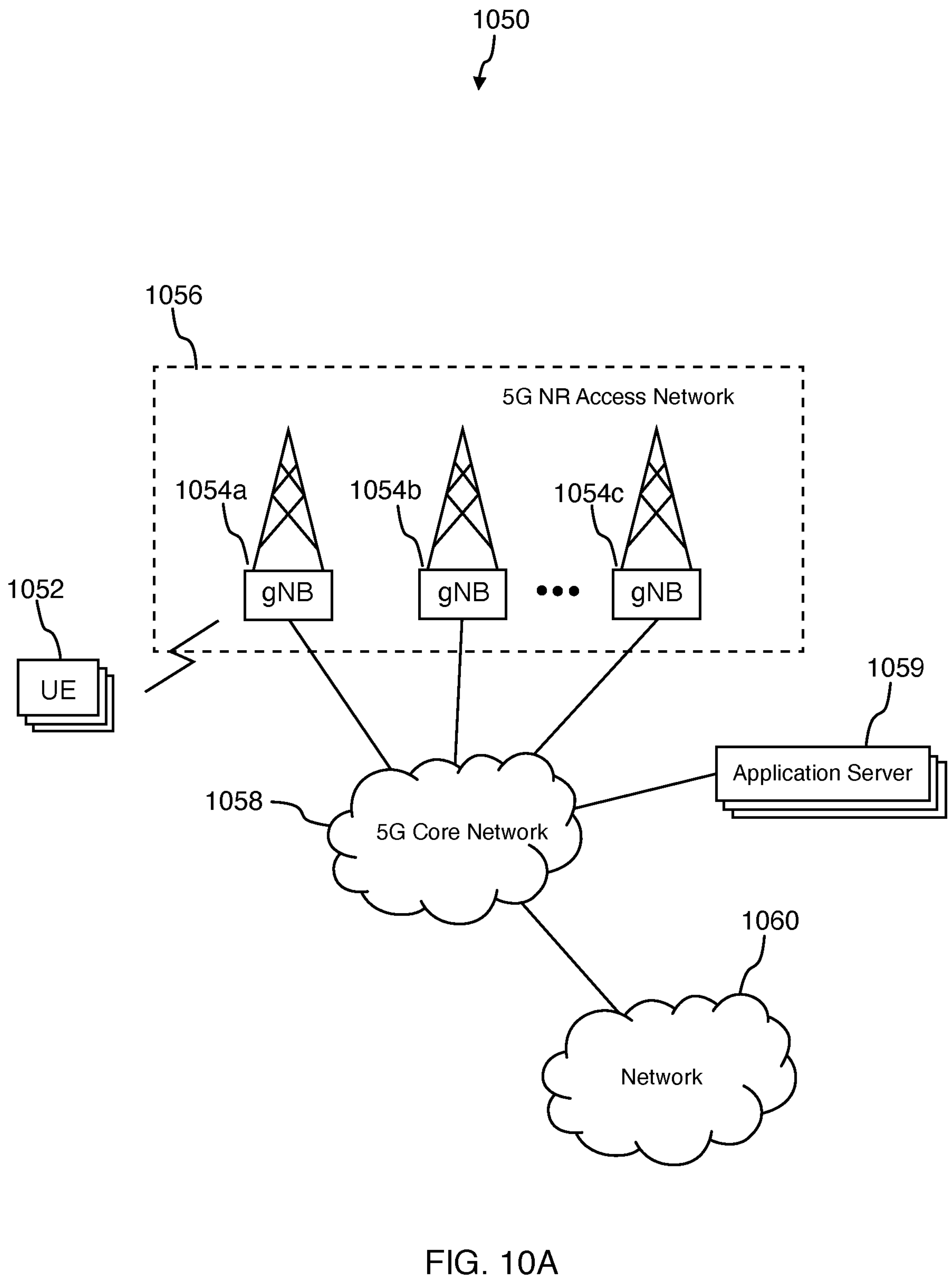
FIG. 10A is a diagram of a communication system according to an example of the disclosure.

Turning now to FIG. 10A, an exemplary communication system 1050 is described. Typically the communication system 1050 includes a number of access nodes 1054 that are configured to provide coverage in which UEs 1052 such as cell phones, tablet computers, machine-type-communication devices, tracking devices, embedded wireless modules, and/or other wirelessly equipped communication devices (whether or not user operated), can operate. The access nodes 1054 may be said to establish an access network 1056. The access network 1056 may be referred to as a radio access network (RAN) in some contexts. In a 5G technology generation an access node 1054 may be referred to as a next Generation Node B (gNB). In 4G technology (e.g., long-term evolution (LTE) technology) an access node 1054 may be referred to as an evolved Node B (eNB). In 3G technology (e.g., code division multiple access (CDMA) and global system for mobile communication (GSM)) an access node 1054 may be referred to as a base transceiver station (BTS) combined with a base station controller (BSC). In some contexts, the access node 1054 may be referred to as a cell site or a cell tower. In some implementations, a picocell may provide some of the functionality of an access node 1054, albeit with a constrained coverage area. Each of these different embodiments of an access node 1054 may be considered to provide roughly similar functions in the different technology generations.

In an embodiment, the access network 1056 comprises a first access node 1054*a*, a second access node 1054*b*, and a third access node 1054*c*. It is understood that the access network 1056 may include any number of access nodes 1054. Further, each access node 1054 could be coupled with a core network 1058 that provides connectivity with various application servers 1059 and/or a network 1060. In an embodiment, at least some of the application servers 1059 may be located close to the network edge (e.g., geographically close to the UE 1052 and the end user) to deliver so-called "edge computing." The network 1060 may be one or more private networks, one or more public networks, or a combination thereof. The network 1060 may comprise the public switched telephone network (PSTN). The network 1060 may comprise the Internet. With this arrangement, a UE 1052 within coverage of the access network 1056 could engage in air-interface communication with an access node 1054 and could thereby communicate via the access node 1054 with various application servers and other entities.

The communication system 1050 could operate in accordance with a particular radio access technology (RAT), with communications from an access node 1054 to UEs 1052 defining a downlink or forward link and communications from the UEs 1052 to the access node 10104 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 1054 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 1054 could define an air interface configured in a specific manner to define physical resources for carrying information wirelessly between the access node 1054 and UEs 1052.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 1052.

In addition, certain resource elements on the example air interface could be reserved for special purposes. For instance, on the downlink, certain resource elements could be reserved to carry synchronization signals that UEs 1052 could detect as an indication of the presence of coverage and to establish frame timing, other resource elements could be reserved to carry a reference signal that UEs 1052 could measure in order to determine coverage strength, and still other resource elements could be reserved to carry other control signaling such as PRB-scheduling directives and acknowledgement messaging from the access node 1054 to served UEs 1052. And on the uplink, certain resource elements could be reserved to carry random access signaling from UEs 1052 to the access node 1054, and other resource elements could be reserved to carry other control signaling such as PRB-scheduling requests and acknowledgement signaling from UEs 1052 to the access node 1054.

The access node 1054, in some instances, may be split functionally into a radio unit (RU), a distributed unit (DU), and a central unit (CU) where each of the RU, DU, and CU have distinctive roles to play in the access network 1056. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 10B:
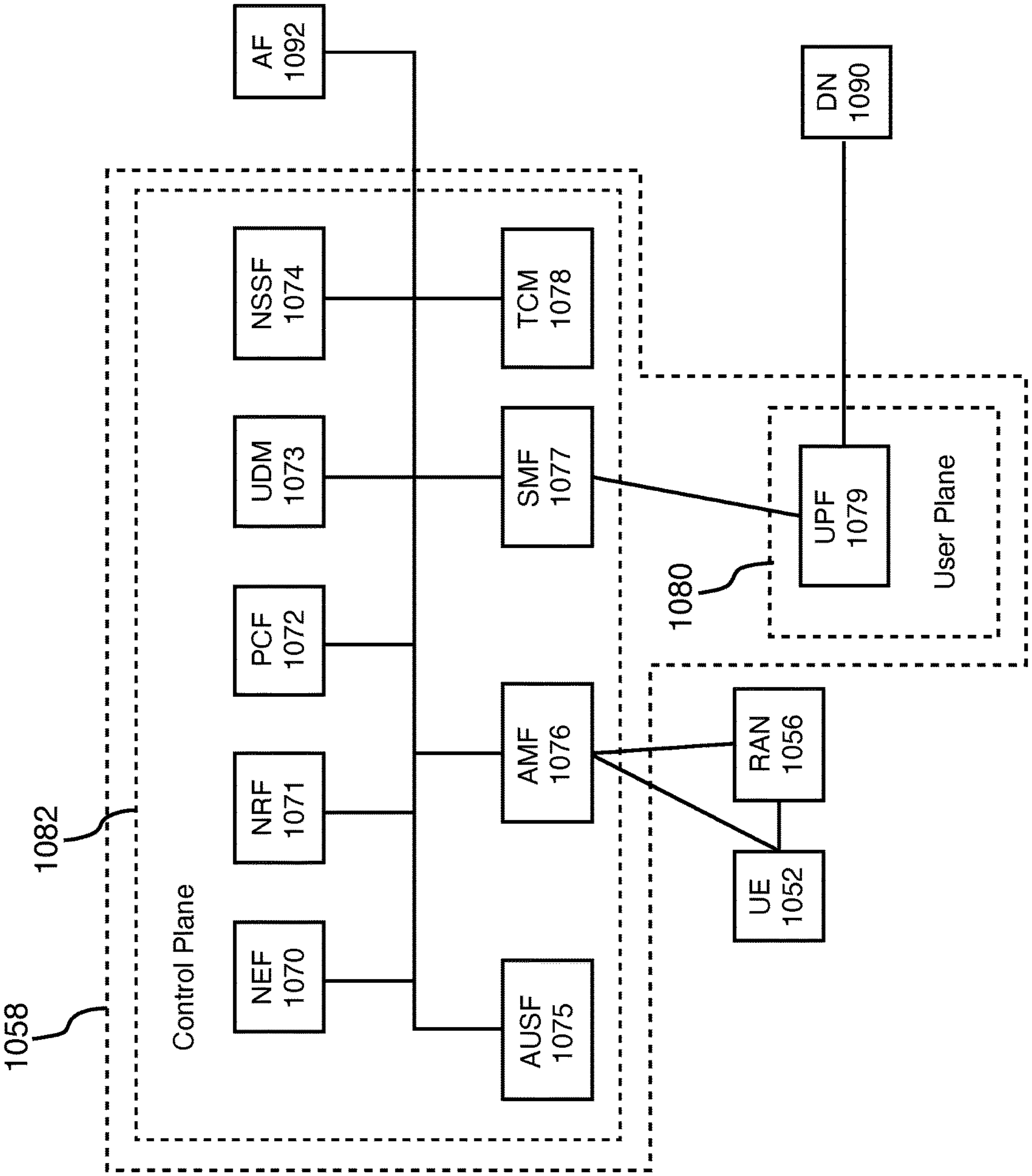
FIG. 10B is a diagram of a macro core network according to an example of the disclosure.

Turning now to FIG. 10B, further details of the core network 1058 are described. In an embodiment, the core network 1058 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 1079, an authentication server function (AUSF) 1075, an access and mobility management function (AMF) 1076, a session management function (SMF) 1077, a network exposure function (NEF) 1070, a network repository function (NRF) 1071, a policy control function (PCF) 1072, a unified data management (UDM) 1073, a network slice selection function (NSSF) 1074, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 1058 may be segregated into a user plane 1080 and a control plane 1082, thereby promoting independent scalability, evolution, and flexible deployment.

The UPF 1079 delivers packet processing and links the UE 1052, via the access network 1056, to a data network 1090 (e.g., the network 1060 illustrated in FIG. 10A). The AMF 1076 handles registration and connection management of non-access stratum (NAS) signaling with the UE 1052. Said in other words, the AMF 1076 manages UE registration and mobility issues. The AMF 1076 manages reachability of the UEs 1052 as well as various security issues. The SMF 1077 handles session management issues. Specifically, the SMF 1077 creates, updates, and removes (destroys) protocol data unit (PDU) sessions and manages the session context within the UPF 1079. The SMF 1077 decouples other control plane functions from user plane functions by performing dynamic host configuration protocol (DHCP) functions and IP address management functions. The AUSF 1075 facilitates security processes.

The NEF 1070 securely exposes the services and capabilities provided by network functions. The NRF 1071 supports service registration by network functions and discovery of network functions by other network functions. The PCF 1072 supports policy control decisions and flow-based charging control. The UDM 1073 manages network user data and can be paired with a user data repository (UDR) that stores user data such as customer profile information, customer authentication number, and encryption keys for the information. An application function 1092, which may be located outside of the core network 1058, exposes the application layer for interacting with the core network 1058. In an embodiment, the application function 1092 may be execute on an application server 1059 located geographically proximate to the UE 1052 in an "edge computing" deployment mode. The core network 1058 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 1074 can help the AMF 1076 to select the network slice instance (NSI) for use with the UE 1052.

Figure 11:
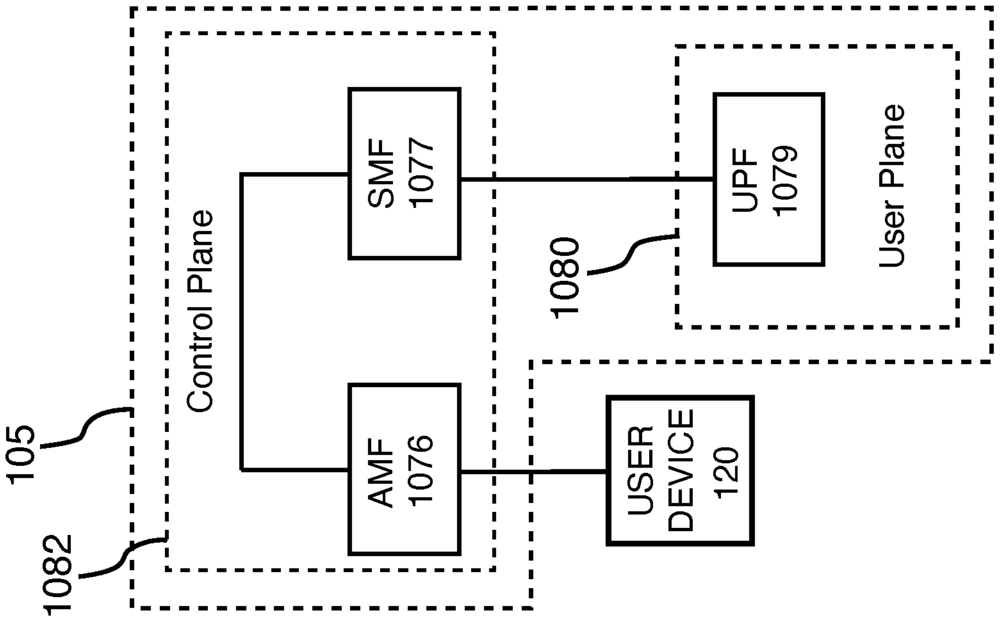
FIG. 11 is a diagram of a mobile core network according to an example of the disclosure.

FIG. 11 is a diagram of a mobile core network 105 according to an example of the disclosure. In an example, the mobile core network 105 may be substantially similar in some regards to the core network 1058, as described above. For example, the mobile core network 105 may include a UPF, AMF, and SMF, as described above. The mobile core network 105 may omit or not include a UDM, UDR, or PCF. In this way, the mobile core network 105 may be microtized, or have reduced functionality, compared to the core network 1058. In some examples, the mobile core network 105 may be implemented on an SoC, as described above.

Figure 12A:
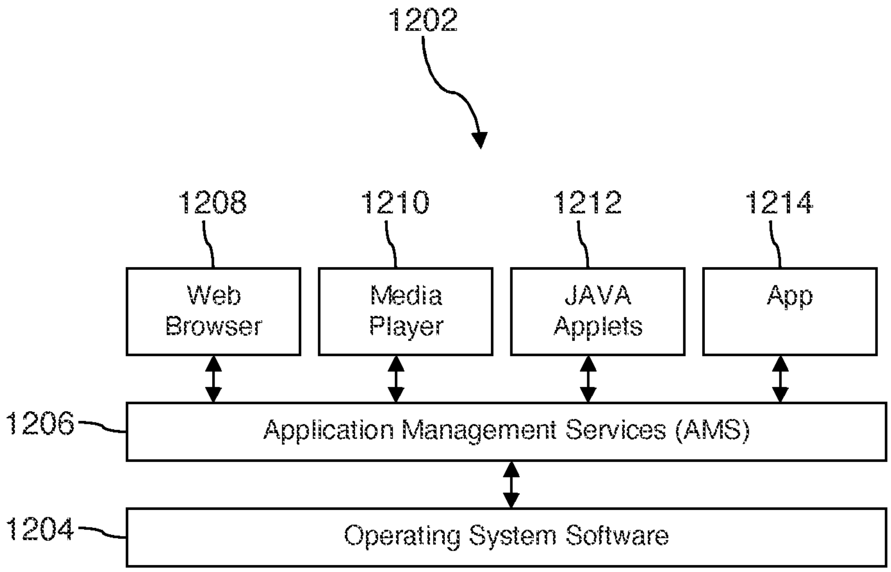
FIG. 12A illustrates a software environment that may be implemented by a DSP according to an example of the disclosure.

FIG. 12A illustrates a software environment 1202 that may be implemented by the DSP 902. The DSP 902 executes operating system software 1204 that provides a platform from which the rest of the software operates. The operating system software 1204 may provide a variety of drivers for the handset hardware with standardized interfaces that are accessible to application software. The operating system software 1204 may be coupled to and interact with application management services (AMS) 1206 that transfer control between applications running on the UE 800. Also shown in FIG. 7A are a web browser application 1208, a media player application 1210, and JAVA applets 1212. The web browser application 1208 may be executed by the UE 800 to browse content and/or the Internet, for example when the UE 800 is coupled to a network via a wireless link. The web browser application 1208 may permit a user to enter information into forms and select links to retrieve and view web pages. The media player application 1210 may be executed by the UE 800 to play audio or audiovisual media. The JAVA applets 1212 may be executed by the UE 800 to provide a variety of functionality including games, utilities, and other functionality.

Figure 12B:
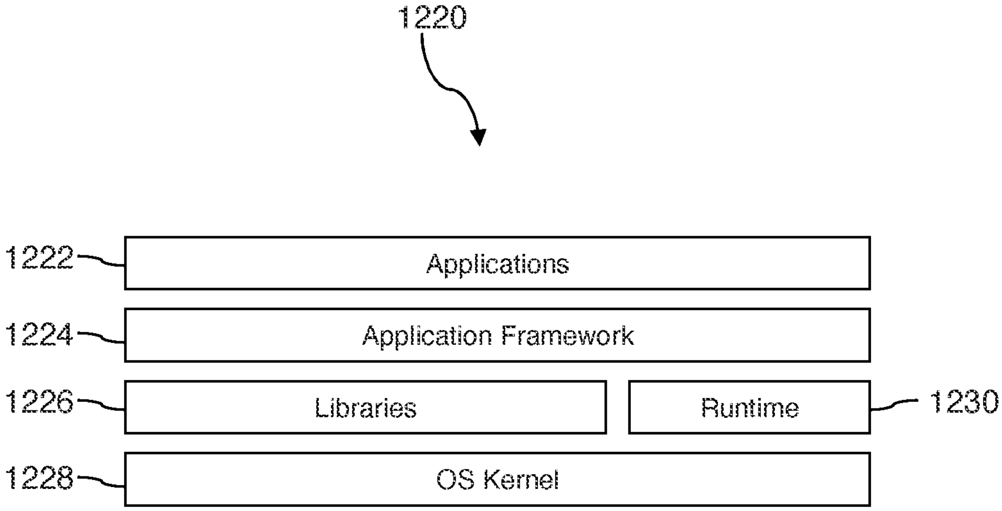
FIG. 12B illustrates an alternative software environment that may be implemented by a DSP according to an example of the disclosure.

FIG. 12B illustrates an alternative software environment 1220 that may be implemented by the DSP 902. The DSP 902 executes operating system kernel (OS kernel) 1228 and an execution runtime 1230. The DSP 902 executes applications 1222 that may execute in the execution runtime 1230 and may rely upon services provided by the application framework 1224. Applications 1222 and the application framework 1224 may rely upon functionality provided via the libraries 1226.

Figure 13:
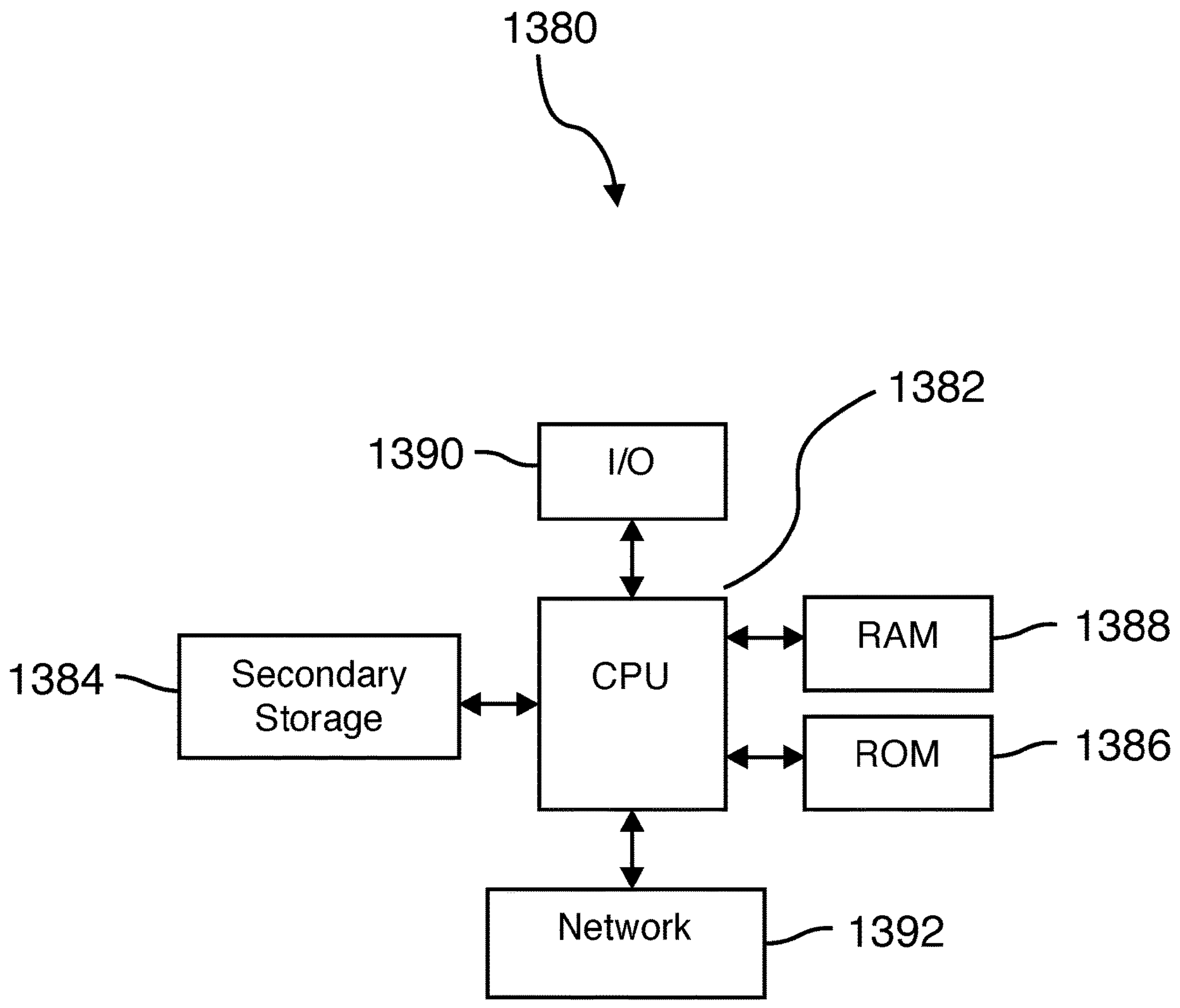
FIG. 13 illustrates a computer system according to an example of the disclosure.

FIG. 13 illustrates a computer system 1380 suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor 1382 may be implemented as one or more CPU chips.

It is understood that by programming and/or loading executable instructions onto the computer system 1380, at least one of the CPU 1382, the RAM 1388, and the ROM 1386 are changed, transforming the computer system 1380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1380 is turned on or booted, the CPU 1382 may execute a computer program or application. For example, the CPU 1382 may execute software or firmware stored in the ROM 1386 or stored in the RAM 1388. In some cases, on boot and/or when the application is initiated, the CPU 1382 may copy the application or portions of the application from the secondary storage 1384 to the RAM 1388 or to memory space within the CPU 1382 itself, and the CPU 1382 may then execute instructions that the application is comprised of. In some cases, the CPU 1382 may copy the application or portions of the application from memory accessed via the network connectivity devices 1392 or via the I/O devices 1390 to the RAM 1388 or to memory space within the CPU 1382, and the CPU 1382 may then execute instructions that the application is comprised of. During execution, an application may load instructions into the CPU 1382, for example load some of the instructions of the application into a cache of the CPU 1382. In some contexts, an application that is executed may be said to configure the CPU 1382 to do something, e.g., to configure the CPU 1382 to perform the function or functions promoted by the subject application. When the CPU 1382 is configured in this way by the application, the CPU 1382 becomes a specific purpose computer or a specific purpose machine.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage 1384. The RAM 1388 is used to store volatile data and perhaps to store instructions. Access to both ROM 1386 and RAM 1388 is typically faster than to secondary storage 1384. The secondary storage 1384, the RAM 1388, and/or the ROM 1386 may be referred to in some contexts as computer readable storage media and/or non-transitory computer readable media.

I/O devices 1390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 1392 may provide wired communication links and/or wireless communication links (e.g., a first network connectivity device 1392 may provide a wired communication link and a second network connectivity device 1392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 1392 may enable the processor 1382 to communicate with the Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave.

Such information, which may include data or instructions to be executed using processor 1382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 1382 executes instructions, codes, computer programs, scripts which it accesses from hard disk, floppy disk, optical disk (these various disk-based systems may all be considered secondary storage 1384), flash drive, ROM 1386, RAM 1388, or the network connectivity devices 1392. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1384, for example, hard drives, floppy disks, optical disks, and/or other device, the ROM 1386, and/or the RAM 1388 may be referred to in some contexts as non-transitory instructions and/or non-transitory information.

In an embodiment, the computer system 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1380 to provide the functionality of a number of servers that is not directly bound to the number of computers in the computer system 1380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1380, at least portions of the contents of the computer program product to the secondary storage 1384, to the ROM 1386, to the RAM 1388, and/or to other non-volatile memory and volatile memory of the computer system 1380. The processor 1382 may process the executable instructions and/or data structures in part by directly accessing the computer program product, for example by reading from a CD-ROM disk inserted into a disk drive peripheral of the computer system 1380. Alternatively, the processor 1382 may process the executable instructions and/or data structures by remotely accessing the computer program product, for example by downloading the executable instructions and/or data structures from a remote server through the network connectivity devices 1392. The computer program product may comprise instructions that promote the loading and/or copying of data, data structures, files, and/or executable instructions to the secondary storage 1384, to the ROM 1386, to the RAM 1388, and/or to other non-volatile memory and volatile memory of the computer system 1380.

In some contexts, the secondary storage 1384, the ROM 1386, and the RAM 1388 may be referred to as a non-transitory computer readable medium or a computer readable storage media. A dynamic RAM embodiment of the RAM 1388, likewise, may be referred to as a non-transitory computer readable medium in that while the dynamic RAM receives electrical power and is operated in accordance with its design, for example during a period of time during which the computer system 1380 is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system in a transportation vehicle, the communication system for relaying data communication between a user device and a macro core network and comprising:

a first access point disposed in the transportation vehicle;

a first antenna disposed in the transportation vehicle and coupled to the first access point;

a second antenna disposed in the transportation vehicle and coupled to the first access point, wherein the first access point is configured to receive a first communication from the user device via one of the first antenna or the second antenna and transmit a second communication based on the first communication;

a mobile core network disposed in the transportation vehicle and coupled to the first access point, the mobile core network configured to receive the second communication from the first access point and aggregate the second communication; and a third antenna disposed on an exterior of the transportation vehicle and coupled to the mobile core network, wherein the mobile core network is configured to transmit the aggregated second communication via the third antenna to the macro core network.

2. The communication system of claim 1, wherein the transportation vehicle is a train having multiple cars, wherein the first access point, first antenna, and second antenna are disposed in a first of the multiple cars and the mobile core network is disposed in a second of the cars.

3. The communication system of claim 2, further comprising a second access point, a fourth antenna, and a fifth antenna, each disposed in a third of the multiple cars, wherein the mobile core network is coupled to the second access point.

4. The communication system of claim 1, wherein the user device communicatively couples to the first access point via one of the first or second antennas, and wherein the mobile core network provides backhaul communication between the user device and the macro core network via the third antenna.

5. The communication system of claim 1, wherein the first access point is coupled to the mobile core network via a fiber optic cable.

6. The communication system of claim 1, wherein the first access point is coupled to the mobile core network via a wireless connection.

7. The communication system of claim 1, wherein the third antenna supports multiple modalities of communication, including at least satellite communication and communication via a terrestrial radio access network.

8. The communication system of claim 1, further comprising a line of sight communication system mounted to an exterior of the transportation vehicle and positioned parallel to a surface on which the transportation vehicle is configured to travel.

9. A communication network implemented in a moving platform having a first compartment and a second compartment, the communication network comprising:

a plurality of access points disposed inside the first compartment;

a mobile core network disposed in the second compartment and comprising a control plane that comprises an access and mobility management function and a session management function, and a user plane that comprises a user plane function;

a backhaul communication device communicatively coupling the plurality of access points to the mobile core network; and an antenna disposed on an exterior of the moving platform and communicatively coupled to the mobile core network.

10. The communication network of claim 9, wherein the moving platform is a train, the first compartment is a first train car, and the second compartment is a second train car.

11. The communication network of claim 9, further comprising a directional antenna disposed on an exterior of the second compartment, wherein the second compartment is a terminating car of the train, and wherein the directional antenna faces outward from the second compartment in a direction parallel to a direction in which the train is configured to travel.

12. The communication network of claim 9, wherein the backhaul communication device is a fiber optic coupling between the plurality of access points and the mobile core network.

13. The communication network of claim 9, wherein the backhaul communication device is a wireless coupling between the plurality of access points and the mobile core network.

14. The communication network of claim 9, wherein the antenna is one of an omni-directional antenna or an array of directional antennas.

15. The communication network of claim 9, wherein the antenna enables communication between the mobile core network and a macro core network via at least one of a radio access network associated with the macro core network or a satellite communicatively coupled to the macro core network and to the mobile core network.

16. A method of managing communication, comprising:

receiving, at an access point, communication from multiple user devices;

aggregating the communication from the multiple user devices to form a first aggregated communication;

transmitting the first aggregated communication to a mobile core network comprising a control plane that comprises an access and mobility management function and a session management function, and a user plane that comprises a user plane function;

aggregating, at the mobile core network, the first aggregated communication with communication from a second access point to form a second aggregated communication; and transmitting the second aggregated communication to a macro core network.

17. The method of claim 16, wherein transmitting the second aggregated communication to the macro core network comprises transmitting the second aggregated communication via a radio access network associated with the macro core network.

18. The method of claim 16, wherein transmitting the second aggregated communication to the macro core network comprises transmitting the second aggregated communication via a satellite communicatively coupled to the mobile core network and the macro core network.

19. The method of claim 16, wherein transmitting the second aggregated communication to the macro core network comprises transmitting the second aggregated communication via a line of sight transmission.

20. The method of claim 16, wherein the access point is located in a passenger car of a train and the mobile core network is located in a locomotive of the train.

* * * * *